United States Patent
Mansell et al.

(10) Patent No.: US 11,288,066 B2
(45) Date of Patent: Mar. 29, 2022

(54) REGISTER-BASED MATRIX MULTIPLICATION WITH MULTIPLE MATRICES PER REGISTER

(71) Applicant: ARM LIMITED, Cambridge (GB)

(72) Inventors: David Hennah Mansell, Cambridge (GB); Rune Holm, Cambridge (GB); Ian Michael Caulfield, Cambridge (GB); Jelena Milanovic, Sophia Antipolis (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/626,701

(22) PCT Filed: Jun. 8, 2018

(86) PCT No.: PCT/GB2018/051573
§ 371 (c)(1),
(2) Date: Dec. 26, 2019

(87) PCT Pub. No.: WO2019/002811
PCT Pub. Date: Jan. 3, 2019

(65) Prior Publication Data
US 2020/0117450 A1    Apr. 16, 2020

(30) Foreign Application Priority Data

Jun. 28, 2017  (GB) ..................... 1710332

(51) Int. Cl.
*G06F 9/302*    (2018.01)
*G06F 9/30*     (2018.01)
*G06F 17/16*    (2006.01)

(52) U.S. Cl.
CPC ........ *G06F 9/3001* (2013.01); *G06F 9/30036* (2013.01); *G06F 9/30043* (2013.01);
(Continued)

(58) Field of Classification Search
CPC .............. G06F 9/3001; G06F 9/30036; G06F 9/30043; G06F 9/30076; G06F 9/30109; G06F 17/16
See application file for complete search history.

(56) References Cited

U.S. PATENT DOCUMENTS 6,901,422 B1   5/2005 Sazegari
7,792,895 B1   9/2010 Juffa et al.
(Continued)

OTHER PUBLICATIONS

Rubinoff et al., "Advances in Computers", vol. 14, 1976, pp. 35-37.*

(Continued)

*Primary Examiner* — David J. Huisman
(74) *Attorney, Agent, or Firm* — Nixon & Vanderhye P.C.

(57) ABSTRACT

Techniques for performing matrix multiplication in a data processing apparatus are disclosed, comprising apparatuses, matrix multiply instructions, methods of operating the apparatuses, and virtual machine implementations. Registers, each register for storing at least four data elements, are referenced by a matrix multiply instruction and in response to the matrix multiply instruction a matrix multiply operation is carried out. First and second matrices of data elements are extracted from first and second source registers, and plural dot product operations, acting on respective rows of the first matrix and respective columns of the second matrix are performed to generate a square matrix of result data elements, which is applied to a destination register. A higher computation density for a given number of register operands is achieved with respect to vector-by-element techniques.

17 Claims, 18 Drawing Sheets

(52) U.S. Cl.
CPC ...... *G06F 9/30076* (2013.01); *G06F 9/30109* (2013.01); *G06F 17/16* (2013.01)

(56) References Cited

U.S. PATENT DOCUMENTS

| | | |
|---|---|---|
| 7,873,812 B1 | 1/2011 | Mimar |
| 8,626,815 B1 | 1/2014 | Langhammer |
| 9,960,917 B2 * | 5/2018 | Gopal .................. H04L 9/0643 |
| 2004/0111587 A1 | 6/2004 | Nair et al. |
| 2004/0122887 A1 | 6/2004 | Macy |
| 2006/0101245 A1 * | 5/2006 | Nair .................. G06F 9/30036 |
| | | 712/221 |
| 2011/0055517 A1 | 3/2011 | Eichenberger et al. |
| 2011/0153707 A1 * | 6/2011 | Ginzburg ............ G06F 9/30036 |
| | | 708/523 |
| 2012/0011348 A1 | 1/2012 | Eichenberger et al. |
| 2012/0124332 A1 | 5/2012 | Yi et al. |
| 2013/0159665 A1 | 6/2013 | Kashyap |

OTHER PUBLICATIONS

Kozyrakis, "Lecture 14: Vector Processors", Stanford University, 2009, pp. 1-45.*
International Search Report and Written Opinion of the ISA for PCT/GB2018/051573, dated Aug. 13, 2018, 20 pages.
Combined Search and Examination Report for GB 1710332.6, dated Jan. 9, 2018, 7 pages.
Office Action for EP Application No. 18732444.7 dated Feb. 25, 2021, 12 pages.

* cited by examiner

| | | | |
|---|---|---|---|
| 0 | 1 | 2 | 3 |
| 4 | 5 | 6 | 7 |
| 8 | 9 | a | b |
| c | d | e | f |

Source A

| | | | |
|---|---|---|---|
| 0 | 4 | 8 | c |
| 1 | 5 | 9 | d |
| 2 | 6 | a | e |
| 3 | 7 | b | f |

Source B

| | | | |
|---|---|---|---|
| 0 | 1 | 2 | 3 |
| 4 | 5 | 6 | 7 |
| 8 | 9 | a | b |
| c | d | e | f |

Accumulator C

Accumulator C:
4 x 32-bit elements

Source B:
16 x 8-bit elements

Source A:
16 x 8-bit elements

FIG. 5

MMUL FP32 [SWAP] DESTINATION C, SOURCE A, SOURCE B
(UNSET)

MMUL FP32 [SWAP] DESTINATION D, SOURCE A, SOURCE B
(SET)

REGISTER-BASED MATRIX MULTIPLICATION WITH MULTIPLE MATRICES PER REGISTER

This application is the U.S. national phase of International Application No. PCT/GB2018/051573 filed 8 Jun. 2018, which designated the U.S. and claims priority to GB Patent Application No. 1710332.6 filed 28 Jun. 2017, the entire contents of each of which are hereby incorporated by reference.

The present disclosure relates to a data processing apparatus. More particularly it relates to the performance of matrix multiplication in a data processing apparatus.

A contemporary data processing apparatus is typically provided with a number of registers in which it can hold data values which are the subject of the data processing operations of the data processing apparatus. The data processing apparatus may treat the content of such registers as an array of values, for example where a register has a storage capacity to hold 512 bits, the data processing apparatus may treat this as an array of sixteen 32-bit values. The data processing apparatus can then, for example, apply data processing operations to individually specified elements of that array, or to the respective elements of the array of values in a SIMD (single instruction multiple data) manner, for example to multiply each element by a specified value.

In one example embodiment there is an apparatus comprising register storage circuitry having a plurality of registers, each register to store at least four data elements; decoder circuitry responsive to a matrix multiply instruction to generate control signals, wherein the matrix multiply instruction specifies in the plurality of registers: a first source register, and second source register, and a destination register; and data processing circuitry responsive to the control signals to perform a matrix multiply operation comprising: extracting a first matrix of data elements from the first source register; extracting a second matrix of data elements from the second source register; performing plural dot product operations to generate a square matrix of result data elements, wherein each dot product operation acts on a respective row of the first matrix of data elements and a respective column of the second matrix of data elements to generate a respective result data element of the square matrix of result data elements; and applying the square matrix of result data elements to the destination register.

In another example embodiment there is a method of operating data processing apparatus comprising generating control signals in response to a matrix multiply instruction, wherein the matrix multiply instruction specifies in a plurality of registers, each register capable of storing at least four data elements: a first source register, and second source register, and a destination register; and performing a matrix multiply operation in response to the control signals comprising: extracting a first matrix of data elements from the first source register; extracting a second matrix of data elements from the second source register; performing plural dot product operations to generate a square matrix of result data elements, wherein each dot product operation acts on a respective row of the first matrix of data elements and a respective column of the second matrix of data elements to generate a respective result data element of the square matrix of result data elements; and applying the square matrix of result data elements to the destination register.

In another example embodiment there is an apparatus comprising means for generating control signals in response to a matrix multiply instruction, wherein the matrix multiply instruction specifies in a plurality of registers, each register capable of storing at least four data elements: a first source register, and second source register, and a destination register; and means for performing a matrix multiply operation in response to the control signals comprising: means for extracting a first matrix of data elements from the first source register; means for extracting a second matrix of data elements from the second source register; means for performing plural dot product operations to generate a square matrix of result data elements, wherein each dot product operation acts on a respective row of the first matrix of data elements and a respective column of the second matrix of data elements to generate a respective result data element of the square matrix of result data elements; and means for applying the square matrix of result data elements to the destination register.

The present techniques will be described further, by way of example only, with reference to embodiments thereof as illustrated in the accompanying drawings, in which:

FIG. 1 schematically illustrates a data processing apparatus which can embody various examples of the present techniques;

FIG. 2A schematically illustrates a vector-by-element technique for generating four elements for storage in an accumulator register C using a specified element from source register A and an array of values from source register B, whilst FIG. 2B schematically illustrates one embodiment of the present techniques according to which a square matrix of data elements taken from source register A is multiplied by a square matrix of elements taken from source register B to generate a square matrix of elements to be accumulated in destination register C;

FIG. 3 schematically illustrates circuitry provided in one embodiment to support a matrix multiplication operation such as that shown in FIG. 2B;

FIG. 4 illustrates one embodiment of the present techniques wherein a 4×4 matrix is generated by the multiplication of a pair of 4×4 matrices;

FIG. 5 illustrates an embodiment of the present techniques wherein the source element size differs from the result element size and in which a 2×8 matrix of elements is multiplied by a 8×2 matrix of elements to generate a 2×2 matrix;

Figure 6:
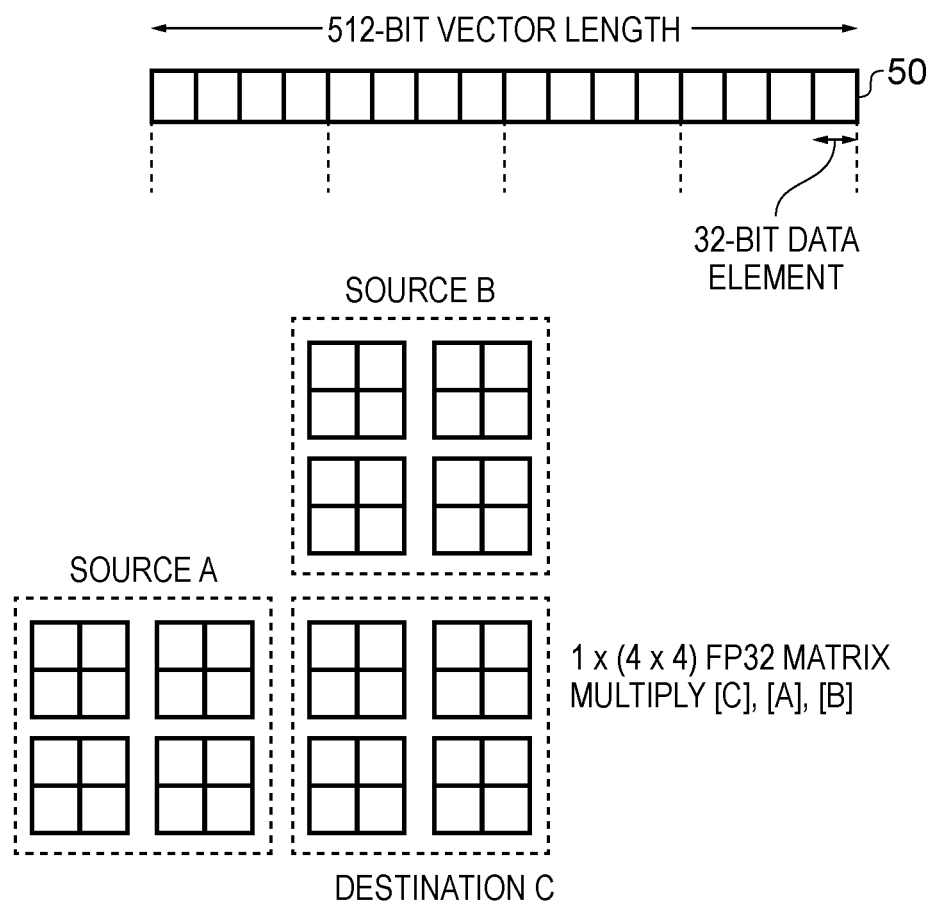
Figure 7A:
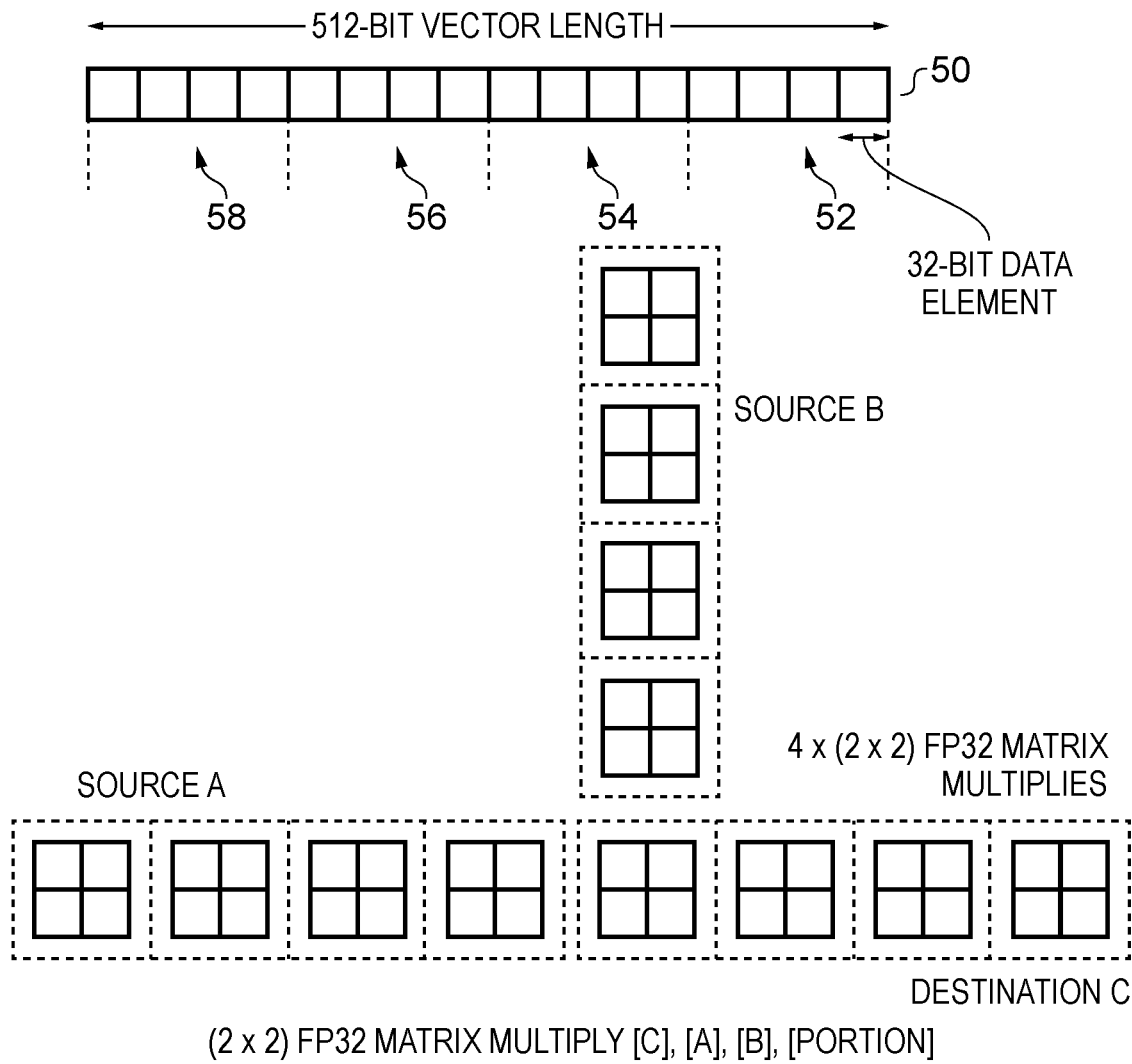
Figure 7B:
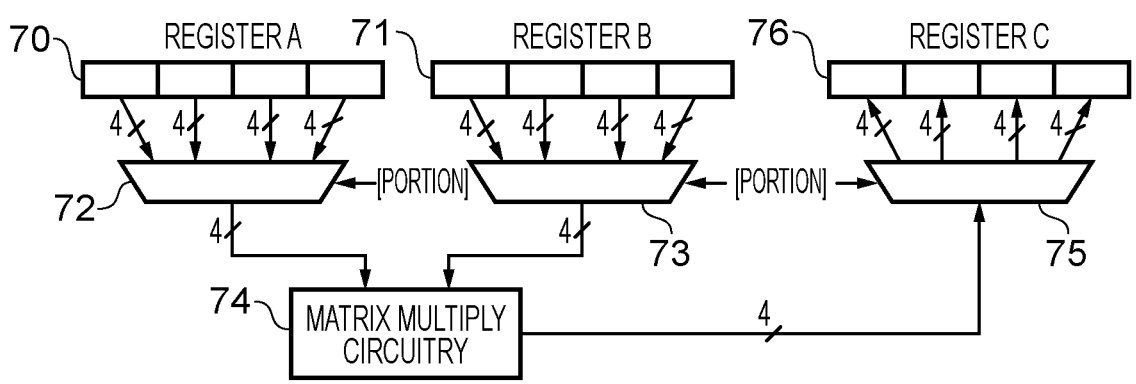
Figure 8:
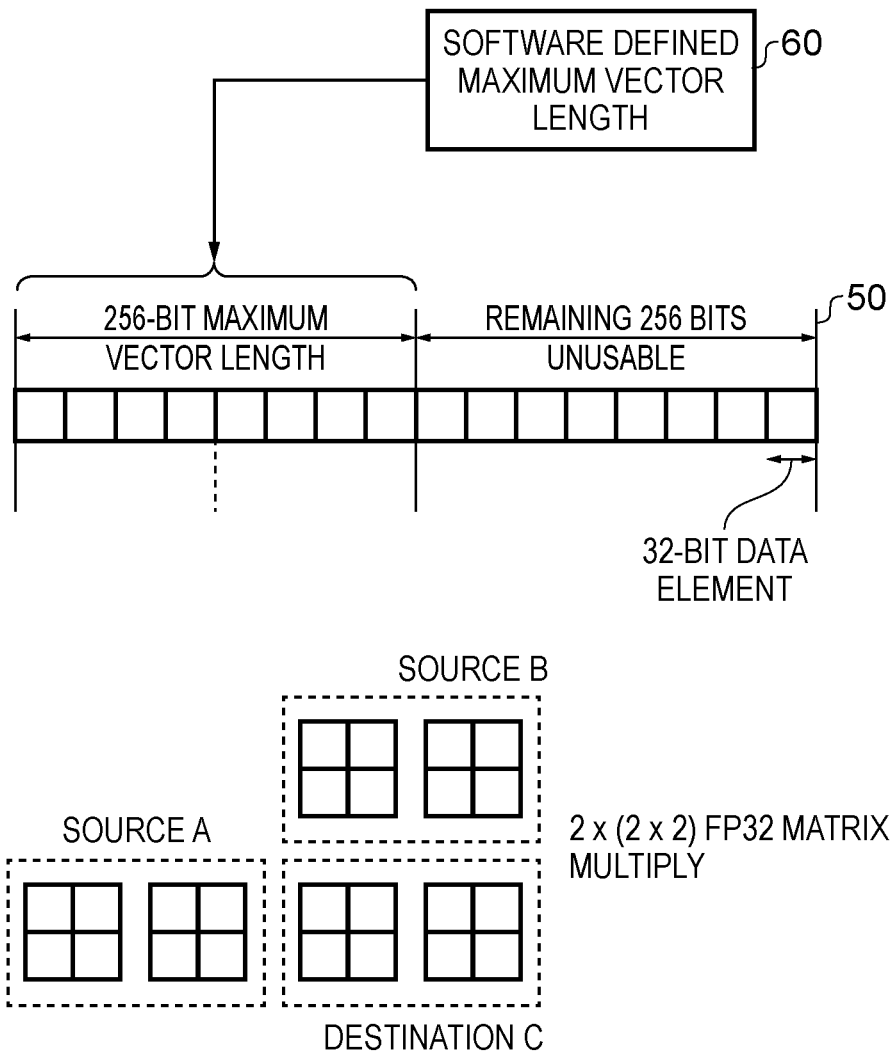
Figure 9:
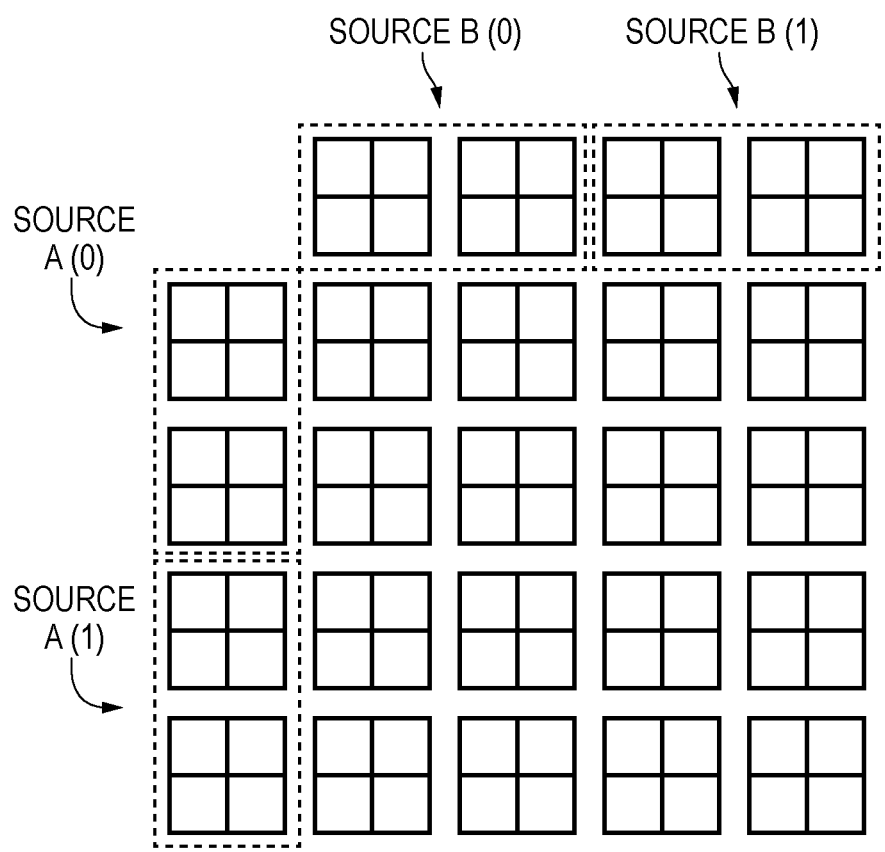
Figure 10:
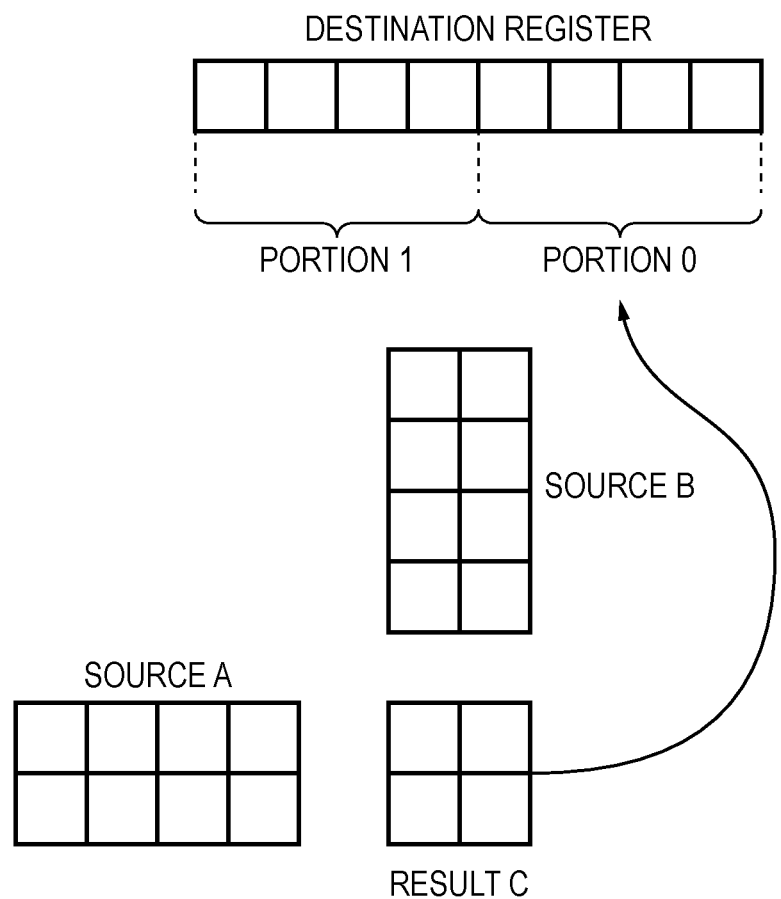
Figure 11A:
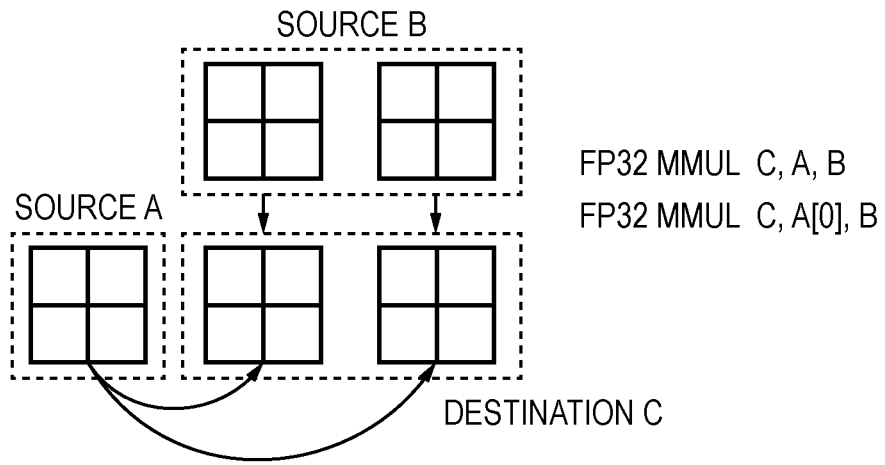
Figure 11B:
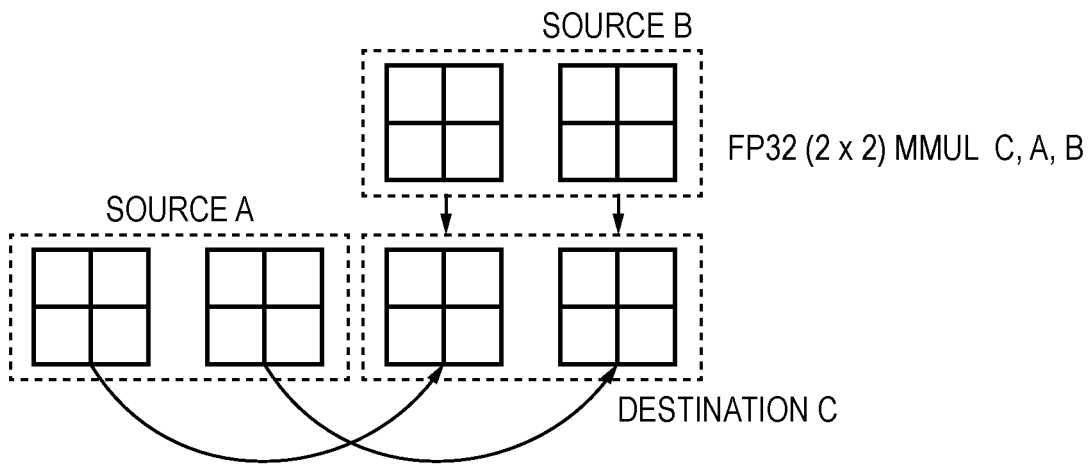
Figure 11C:
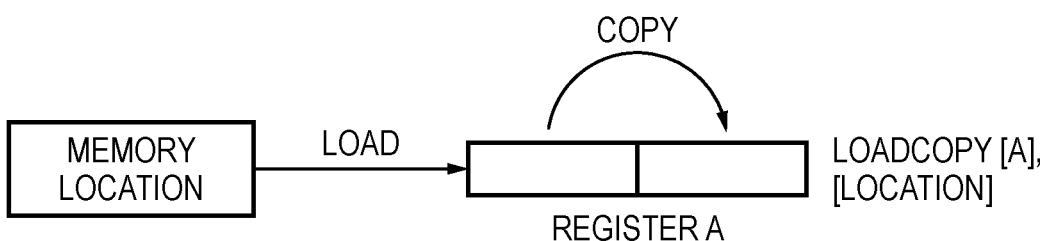
Figure 11D:
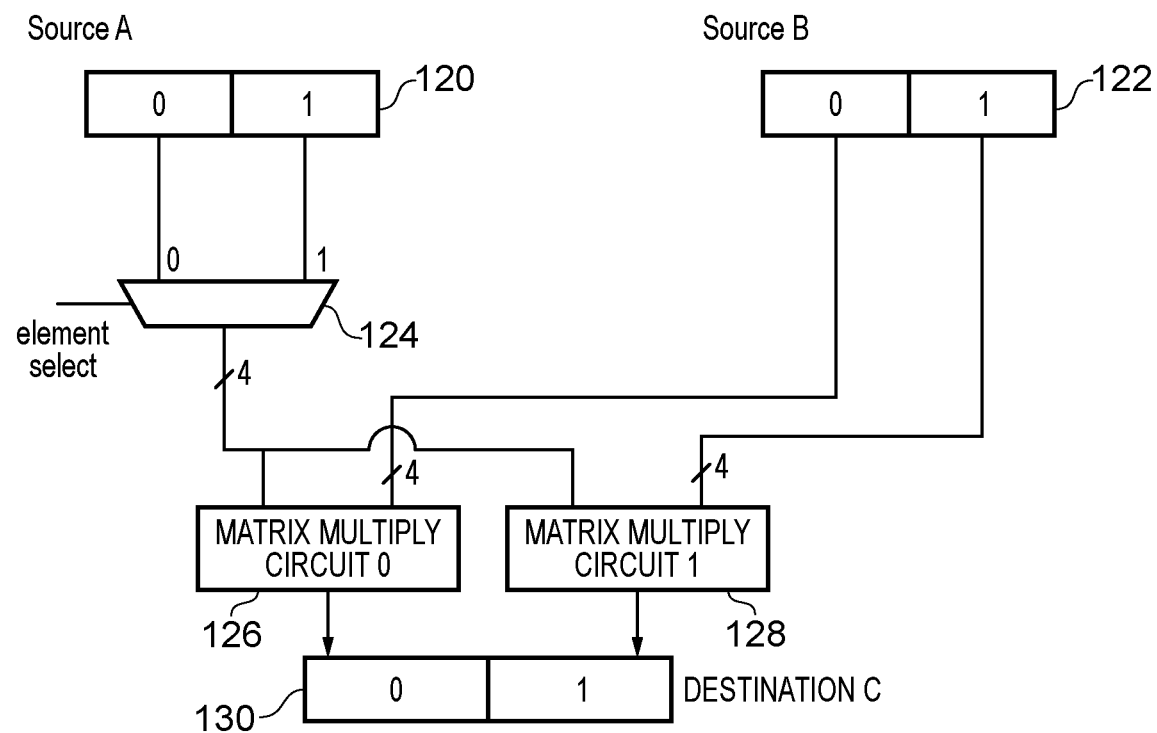
Figure 12A:
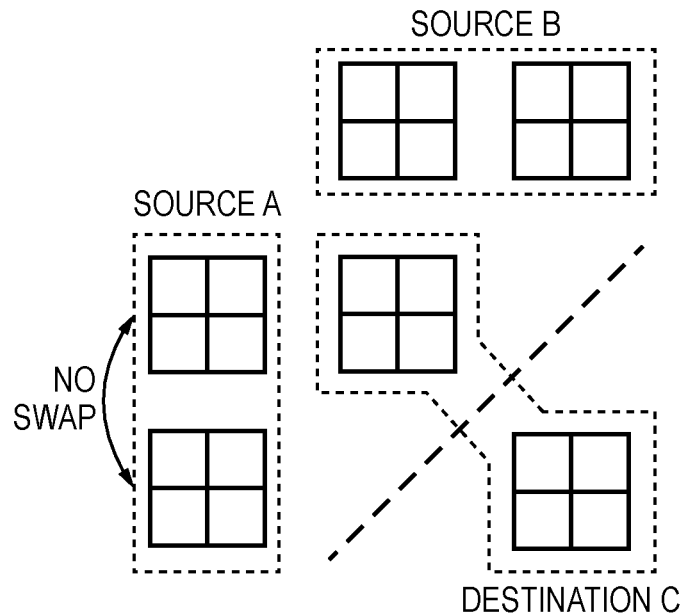
Figure 12B:
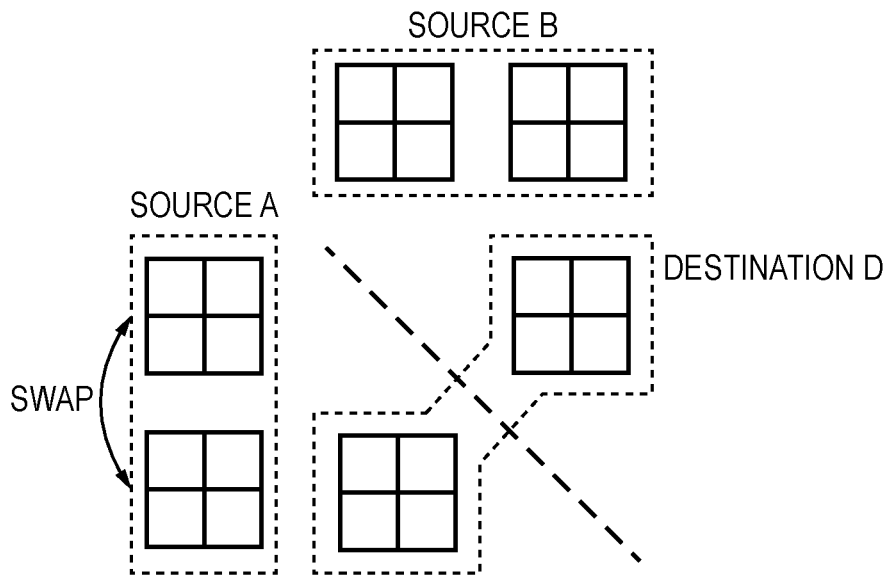
Figure 12C:
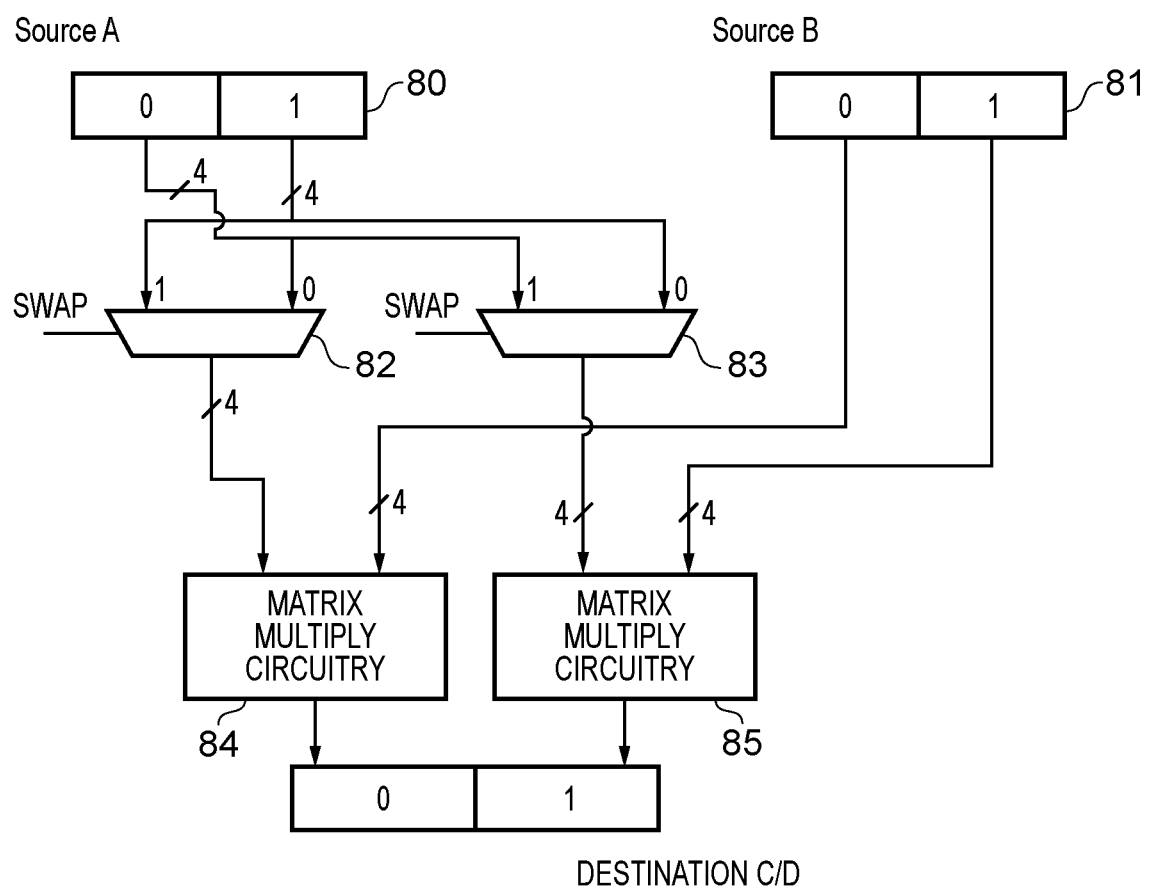
Figure 13:
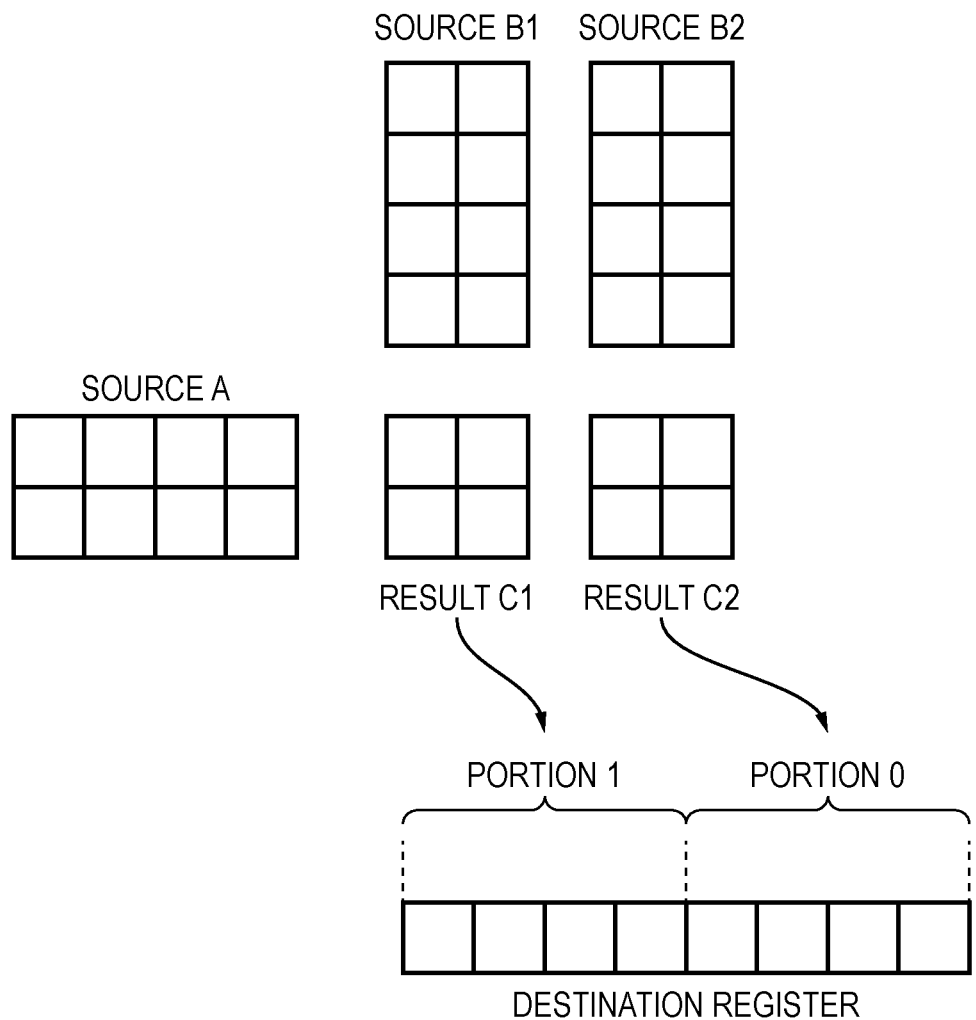
Figure 14:
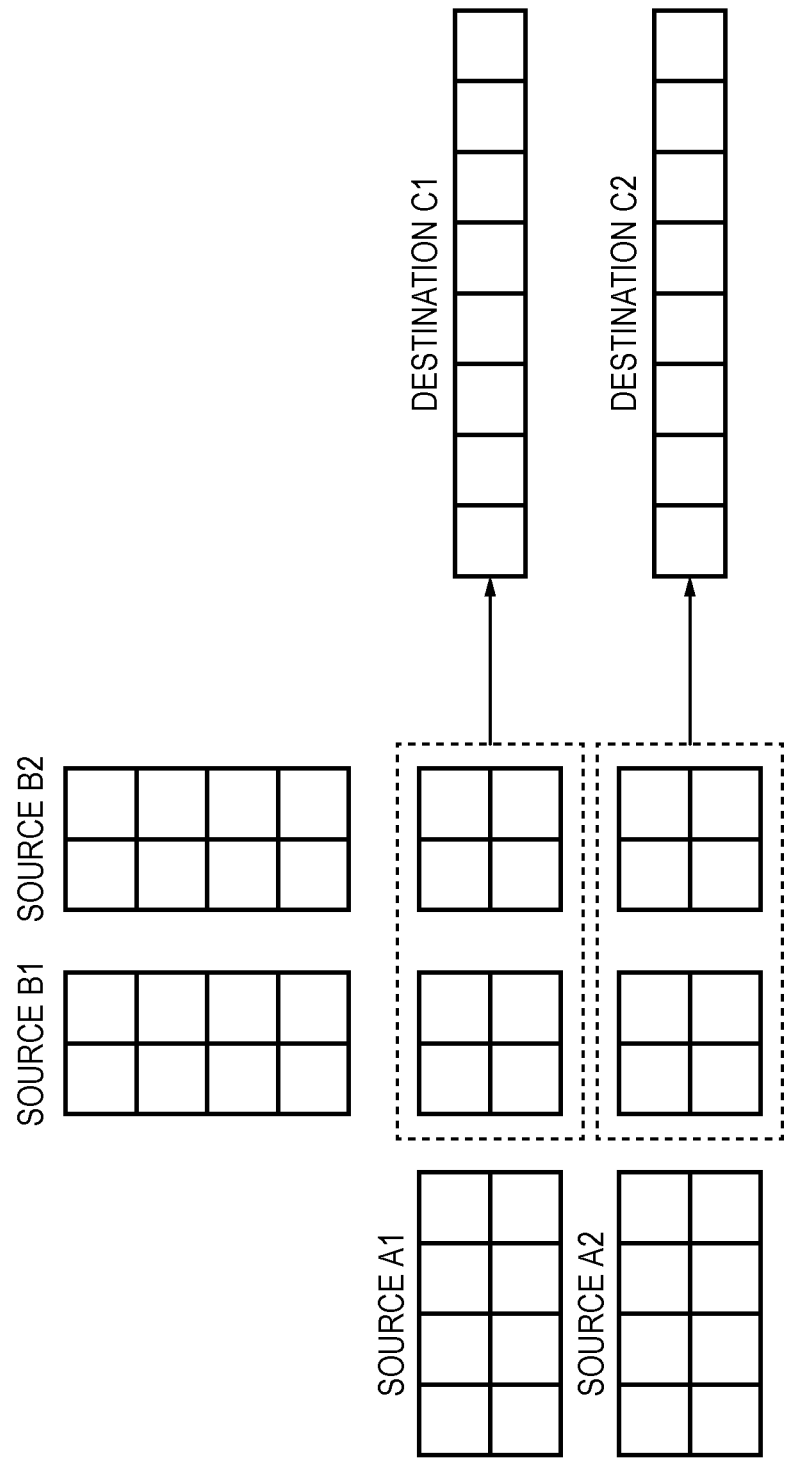
Figure 15:
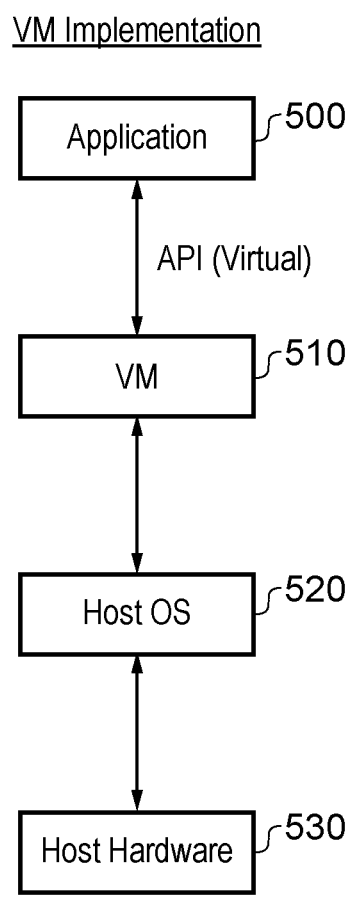
Figure 16:
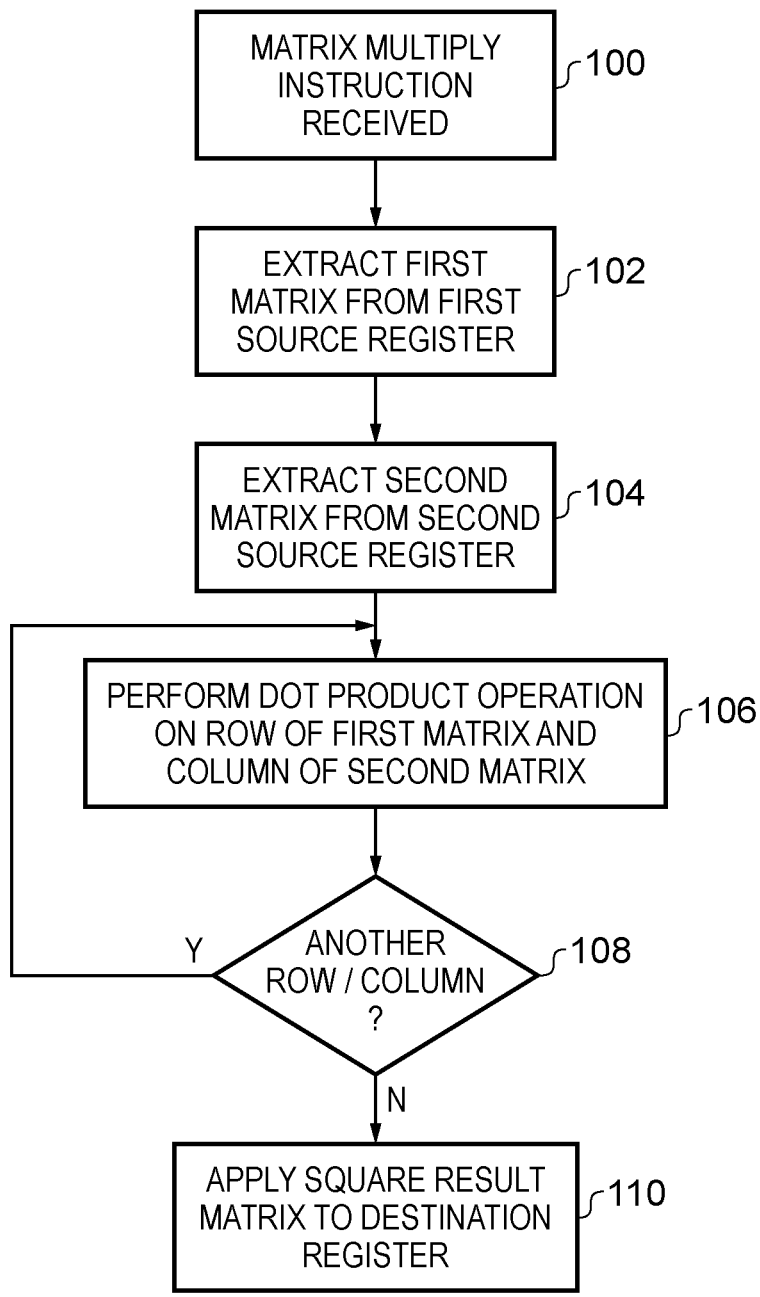

FIG. 6 schematically illustrates a pair of 4×4 matrices being multiplied together to form a 4×4 matrix according to the present techniques;

FIG. 7A schematically illustrates, for the same source and destination registers as illustrated in FIG. 6, the performance of four separate 2×2 matrix multiplications according to the present techniques;

FIG. 7B schematically illustrates more detail of circuitry implementing the example of FIG. 7A in one embodiment;

FIG. 8 schematically illustrates the imposition of a software defined maximum vector length in one embodiment of the present techniques and the restriction of the use of the same source and destination registers as illustrated in FIGS. 6 and 7 such that two 2×2 matrix multiplications are performed;

FIG. 9 schematically illustrates a 8×2 matrix being multiplied by a 2×8 matrix to generate a 8×8 matrix, and equivalently illustrates the performance of four matrix multiply operations between a 4×2 and a 2×4 matrix to generate a 4×4 matrix;

FIG. 10 schematically illustrates an instruction provided by the present techniques being used to generate a square result matrix which only occupies a portion of the specified destination register and a variant in which that portion is specified within the instruction;

FIG. 11A schematically illustrates the operation of an instruction provided by the present techniques which extracts an operand matrix from a portion of a source register and performs a matrix multiply operation using that matrix with matrices taken from respective portions of another source register to generate two result square matrices;

FIG. 11B schematically illustrates respective portions of two source registers being used to provide two respective square source matrices from each, these being multiplied together to generate two square result matrices; and FIG. 11C schematically illustrates a copying load operation used by the present techniques in which a data value is loaded from a specified memory location and copied into each half of a destination register;

FIG. 11D schematically illustrates example detail of some circuitry supporting the examples of FIGS. 11A and 11B in one embodiment;

FIGS. 12A and 12B schematically illustrate the operation of an instruction provided by the present techniques according to which a swopping of the content of two halves of a specified source register can be selectively carried out by setting or not setting a flag in the instruction;

FIG. 12C schematically illustrates example detail of some circuitry supporting the examples of FIGS. 12A and 12B in one embodiment;

FIG. 13 schematically illustrates the performance of a matrix multiplication operation according to the present techniques wherein one operand matrix for the matrix multiplication is provided by two source registers;

FIG. 14 schematically illustrates a variant on the technique shown in FIG. 13 wherein both operand matrices are provided by two source registers and in which the resulting square matrix is stored across two destination registers;

FIG. 15 schematically illustrates a virtual machine implementation that may be used; and FIG. 16 shows a sequence of steps which are taken according to the method of one embodiment.

At least some embodiments provide an apparatus comprising register storage circuitry having a plurality of registers, each register to store at least four data elements; decoder circuitry responsive to a matrix multiply instruction to generate control signals, wherein the matrix multiply instruction specifies in the plurality of registers: a first source register, and second source register, and a destination register; and data processing circuitry responsive to the control signals to perform a matrix multiply operation comprising: extracting a first matrix of data elements from the first source register; extracting a second matrix of data elements from the second source register; performing plural dot product operations to generate a square matrix of result data elements, wherein each dot product operation acts on a respective row of the first matrix of data elements and a respective column of the second matrix of data elements to generate a respective result data element of the square matrix of result data elements; and applying the square matrix of result data elements to the destination register.

The present techniques facilitate the performance of matrix multiplication operations using data values representing matrix elements held in registers of the apparatus by the provision of a matrix multiply instruction, and the corresponding circuitry within the apparatus responsive to that instruction, which implements an approach according to which the content of the registers specified in the instruction are treated as matrices of data elements. In this manner, in response to the matrix multiply instruction, the data processing circuitry extracts first and second matrices of data elements from the specified first and second source registers respectively. Furthermore, the data processing circuitry then performs a plurality of dot product operations to generate a square matrix of result data elements. From the nature of matrix multiplication it will be understood that each of these dot product operations is carried out for a respective result data element of the square matrix with reference to a respective row of one operand matrix of data elements and a respective column of the other operand matrix of data elements. It is to be noted that the resulting matrix is square, i.e. comprises at a minimum four data elements (in a 2×2 configuration), but the present techniques are applicable to the generation of any square matrix of result data elements (i.e. 3×3, 4×4, 5×5, etc.). The resulting square matrix of results data elements generated is applied to a destination register specified in the instruction, wherein the matrix representation which that destination register holds is understood by the apparatus.

It should further be noted that the approach taken by the present techniques is not merely one of representation, i.e. an arbitrary choice of the Semantic meaning of the content of a given register. This can be understood with reference to an alternative technique for performing matrix multiplication in the data processing apparatus in which registers hold plural data elements. In this alternative technique a variety of matrix multiplication may be carried out by performing a "vector-by-element" operation with respect to the content of two source registers, wherein a specified element is extracted from one source register, whilst a vector of elements is extracted from another source register. In this manner, the dot product operations corresponding to the generation of a single matrix row (or equivalently a single matrix column) may be carried out. Further such operations can then be performed corresponding to further rows (or columns) of the result matrix. However, the present techniques recognise that a further difference between the implementation of this alternative technique to that of the present techniques is that the described vector-by-element operation, when applied in an example where the vector comprises four elements, would then typically comprise three vector reads (corresponding to the two source registers and a destination accumulator register) four parallel multiply-accumulate operations (i.e. one for the generation of each element in the generated vector corresponding to a row of the result matrix), and finally one vector write (corresponding to writing the generated vector into the destination register). This may be compared to the situation when a matrix multiply instruction according to the present techniques is used, wherein a first matrix of data elements from a first source register is multiplied by a second matrix of data elements from a second source register to generate a square matrix of result data elements, which may then (in some embodiments) be accumulated in the specified destination register. Accordingly, similarly to the above-mentioned alternative technique, the implementation of the present techniques in this example also requires three vector reads (for each of the two source registers and for the accumulator destination register) and one vector write (to write back the result of the accumulation into the destination accumulator register). However in implementing the matrix multiplication, the matrix multiply instruction of the present techniques initiates eight operations (i.e. in this example of the generation of a 2×2 square matrix, two data element multiplications being performed for each result data element in the result square matrix, these being summed together to generate the value which will be accumulated with the existing value for this position in the matrix). Accordingly, for the same register accesses, the present techniques implement a greater density of multiply-accumulate operations. Moreover, it is to be noted that whilst in the above-discussed example of the generation of a 2×2 square matrix this density of multiply-accumulate operations is doubled, but this ratio scales with the size of the square matrix being generated. For example, in generating a 4×4 square matrix of result data elements an instruction of the present techniques initiates 64 multiply-accumulate operations, in other words four times more multiply-accumulates than a vector-by-element approach for the same number of register accesses.

The present techniques propose applying the square matrix of result data elements to a destination register specified in the matrix multiply instruction and this may be carried out in a number of ways. In some embodiments applying the square matrix of result data elements to the destination register comprises storing the square matrix of result data elements in the destination register. In other words, the square matrix of result data elements may be directly stored into the destination register without regard to any pre-existing content of that destination register, overwriting its content. Depending on the nature of the data processing operations being performed by the apparatus, pre-existing content of the destination register may or may not be required to be taken into account. Thus, in other examples in which the content of the destination register should be taken into account, and in particular where the destination register already holds a corresponding square matrix of data elements, it may be the case that the generated square matrix of result data elements should be accumulated with the existing square matrix held in the destination register, and accordingly in some embodiments applying the square matrix of result data elements to the destination register comprises accumulating the square matrix of result data elements with a previously stored square matrix of result data elements stored in the destination register.

Further flexibility in the manner in which the content of either source register or the destination register is interpreted is also proposed. In particular, it is proposed that the bit length of data elements in the first and second matrix of data elements (taken from the first and second source registers) need not be the same as the bit length of the data elements of the square matrix of result data elements. Nevertheless, in some embodiments these may indeed be the same. Accordingly, in some embodiments each data element of the first matrix of data elements and each data element of the second matrix of data elements has a source element bit length which is equal to a result element bit length of each data element of the square matrix of result data elements. Conversely, in other embodiments each data element of the first matrix of data elements and each data element of the second matrix of data elements has a source element bit length which is different from a result element bit length of each data element of the square matrix of result data elements. For example, to take just one illustrative example, in a data processing apparatus using 128-bit registers, a square matrix of 32-bit data elements might be stored, i.e. representing a 2×2 matrix of 32-bit data elements. Whilst such a result square matrix could indeed be generated by the matrix multiplication of two 2×2 matrices, the elements of these source matrices then also being 32-bit data elements, the present techniques also propose that this square matrix of result data elements could also be generated by the matrix multiplication of two source matrices having 16-bit data elements (i.e. a 2×4 matrix of 16-bit data elements multiplied by a 4×2 matrix of 16-bit data elements resulting in a 2×2 matrix of 32-bit data elements). Equally, this 2×2 result matrix of 32-bit data elements could also be generated by the multiplication of a 2×8 matrix and a 8×2 matrix of 8-bit data elements.

Further, therefore, it should be appreciated that the present techniques contemplate that the source element bit length may differ from the result element bit length by a factor of two, but in some embodiments it is contemplated that the source element bit length may differ from the result element bit length by more than a factor of two. Indeed, it is to be noted that, depending on the context in which the instruction proposed by the present techniques is to be implemented, the present techniques even contemplate that the source element bit length could indeed only be a single bit i.e. 1-bit data elements in the source operand matrices. Ternary implementations are also envisaged (in which the source elements may therefore take a value from the set: −1, 0, 1), such examples self-evidently applying to contexts in which the precision of the input data values is of little importance, yet where the parallelism supported by the present techniques may be of much more relevance.

Depending on the implementation, there may be a predetermined bit length of the data elements according to which the apparatus interprets the content of any of the source or destination registers to which it uses in implementing the present techniques. However, there may also be flexibility in this bit length, as the above discussion highlights. Furthermore, whilst it may be the case that for a given bit length of the data elements of the square matrix of result data elements this may directly correspond to the size of the destination register, the present techniques further provide variations in which the dimension of the square matrix of result elements is specified in the matrix multiply instruction. For example, this enables a matrix multiplication operation to be carried out in which the square matrix of result data elements is smaller than the full capacity of the destination register. Moreover in an example in which the apparatus has a given vector length, a matrix multiply instruction which specifies a particular dimension of the square matrix of result elements such that this matches the given vector length would represent an upper limit on the dimension of the square matrix of result elements which can be supported. So for example in an apparatus with a 128-bit vector length, this could enable a matrix multiplication instruction to be executed which requires an operation to be carried out which generates a square matrix of four 32-bit data elements, but a further possibility would be for a square matrix of sixteen 8-bit data elements (i.e. a 4×4 square matrix) to be generated. However, where one square matrix of four 32-bit data elements represents the upper limit of the size of matrix (needing at least four elements) which can be generated on an apparatus with a 128-bit vector length, this instruction could also be executed on another apparatus supporting wider vectors, giving the advantage that a program written for the 128-bit vector length apparatus would be portable across other apparatuses with the same or wider vector lengths. Indeed where the underlying architecture of an apparatus may be defined to have a variable ("scalable") vector length—such as is provided by the Scalable Vector Extension (SVE) for the ARMv8-A architecture provided by ARM® Limited of Cambridge, UK—and hence a range of apparatuses may then be constructed, all equally compliant with that architecture but with a range of possible vector lengths, the same instruction can thus be consistently executed on any of these apparatuses, even though they may have different vector lengths.

Moreover, the ability of the matrix multiply instruction to specify a dimension of the square matrix of the result data elements enables further supports the above-mentioned variant in which the square matrix of result data elements does not necessarily fill the capacity of the destination register. For example, again using the example of a 128-bit vector length, whilst this could accommodate a 4×4 matrix of 8-bit data elements, it is also contemplated that the matrix multiply instruction could restrict the matrix multiply operation performed to the generation of a 2×2 square result matrix, and thus four 8-bit data elements would then be stored in the vector length (only occupying a quarter of its capacity).

The data elements of the first matrix of data elements, the second matrix of data elements, and the data elements resulting from the matrix multiplier operation may take a variety of forms. In some embodiments these may be floating point values, whilst in other embodiments they may be integer values. These integer values may be unsigned or signed.

It will be appreciated from the above discussion that the source matrices (i.e. the first matrix of data elements and the second matrix of data elements) may take a variety of forms and configurations, in particular with regards to the respective dimensions of these matrices. Accordingly, in some embodiments the first matrix of data elements and the second matrix of data elements are square matrices. In other embodiments the first matrix of data elements and the second matrix of data elements are non-square rectangular matrices.

The use of a defined vector length in an apparatus, meaning that a data processing vector register that stores multiple data elements (together referred to herein as a "vector") can only hold vectors for processing which do not exceed this length, will naturally impose a constraint on the total size of the constituent data elements of the vector, in that in total they cannot exceed the total size of that vector length. Nevertheless as mentioned above, the available vector length may vary from one apparatus to another, and here again there is an advantage to having portable software that can run on a variety of vector lengths.

In this context the present techniques contemplate embodiments in which the apparatus may be configured by its user to restrict a vector length that it handles. In other words, the programmer of the apparatus can configure it so that it has a maximum vector length permitted, and subsequent data processing operations carried out in the apparatus must respect that imposed maximum vector length. Accordingly, in some embodiments the decoder circuitry is further responsive to a configuration instruction to generate configuration control signals, wherein the configuration instruction specifies a maximum vector length, and the data processing circuitry is responsive to the configuration control signals to constrain subsequent matrix multiply operations such that a total size of the result data elements does not exceed the maximum vector length. For example, in a situation in which the apparatus has a "native" vector length of, say, 512 bits, this configuration instruction would enable a software limit to be applied to the data processing operations carried out by apparatus according to which it might for example be limited to a maximum vector length of 256 bits. Thus where a given piece of software executing under this constraint expects 256-bit vectors, then the mechanism of imposing a maximum vector length can also be used to ensure that it will run on an apparatus that happens to have longer vectors, whether this is, say, the 512-bit native vector length in the example mentioned above or any other vector length longer than the 256-bit imposed limit.

The imposition of this kind of software limit on the maximum vector length may in turn constrain the subsequent matrix multiply operations (to respect the maximum vector length) in a variety of ways. For example, in some embodiments constraining the subsequent matrix multiply operations comprises generation of the square matrix of result data elements with a dimension for which a total size of the result data elements does not exceed the maximum vector length. Thus, for example where the "native" capacity of the destination register is such that a 4×4 matrix of data elements could be stored there (or, when not occupying its full capacity, a 3×3 or 2×2 matrix of data elements of the same size), the imposition of the software-defined maximum vector length in this situation, where the 4×4 matrix of data elements is then too large for the defined maximum vector length, constrains the matrix multiply operations such that only the 2×2 or 3×3 square matrices of data elements can be generated.

Alternatively or in addition, in other embodiments, such a software-defined maximum vector length can result in the number of square matrices of result data elements being restricted. It is worth noting at this point therefore that whilst the present techniques propose a matrix multiply operation which causes a matrix multiply operation to be carried out which results in the generation of a square matrix of result data elements, this does not preclude the possibility of a further square matrix of result data elements being generated in response to the matrix multiply instruction. To take just one example, in the situation in which the destination register has double the capacity of the size of the result square matrix, matrix multiply operations in response to the matrix multiply instruction may be implemented which generate two square matrices in order to make full use of the storage capacity of the destination register. However, further in the context of the above-mentioned software-defined maximum vector length, this may then constrain the number of square matrices which may be generated in response to the matrix multiply instruction. In the light of the above discussion it will be recognised that the total size of the result elements may be less than a storage capacity of the destination register.

In the context of embodiments in which the dimension of the square matrix of result data elements is specified in the matrix multiply instruction, this may correspond to the destination register capacity directly and accordingly in such embodiments the square matrix of result data elements having the dimension specified in the matrix multiply instruction corresponds to a storage capacity of the destination register.

As mentioned above, the present techniques also propose embodiments in which the storage capacity of the destination register is greater than that required to store the result square matrix of result data elements. Where, in general, the registers used by the present techniques each have the capacity to store at least four data elements, in some embodiments therefore the destination register has a storage capacity accommodating at least eight data elements and to store at least a second square matrix of result data elements. Thus, whilst the generated result square matrices could each have four data elements and both matrices be stored in a destination with the storage capacity to store 8 data elements, in other examples the result square matrices could have 9 data elements (3×3 matrices) and be stored in a destination register having storage capacity to accommodate 18 data elements or two square matrices each having 16 data elements (4×4 matrices) could be stored in a destination register having the storage capacity to accommodate 32 data elements, and so on. Moreover, it will be recognised that the destination register could have a storage capacity to accommodate more than two square matrices of result data elements.

Thus, in the context of embodiments in which the dimension of the square matrix of result data elements is specified in the matrix multiply instruction, the storage capacity of the destination register may be capable of storing more than one square matrix of result data elements having the dimension specified in the matrix multiply instruction.

In embodiments in which the storage capacity of the destination register is sufficient to store more than one result square matrix, the generated square matrix of result data elements may be applied to the destination register in a variety of ways. For example, in some embodiments the data processing circuitry is responsive to the control signals to apply the square matrix of result data elements to a first portion of the destination register. Further, that first portion of the destination register may be defined in a number of ways, in that in some embodiments it is predetermined for the data processing circuitry, i.e. the data processing circuitry will always select a given portion of the destination register to which it will apply the square matrix of results data elements, whereas in other embodiments the matrix multiply instruction further specifies the first portion of the destination register. In other words, the choice of which portion of the destination register to use may be open to the programmer. It will be recognised that the first "portion" of the destination register may represent a different fraction of the whole storage capacity of the destination register, depending on the particular circumstance, but this may for example be a half or a quarter, say, of the destination register.

In examples in which the destination register has a storage capacity which is greater than the total size of the result data elements (i.e. of the square matrix of result data elements) in some embodiments the data processing circuitry is further responsive to the control signals to perform a second matrix multiply operation to generate the second square matrix of result data elements and to apply the second square matrix of result data elements to a second portion of the destination register. Thus, in response to one matrix multiply instruction, more than one matrix multiply operation may be carried out generating more than one result square matrix, which are then applied to respective portions of the destination register.

Where more than one matrix multiply operation is thus performed in response to the matrix multiply instruction, the present techniques envisage a variety of ways in which the respective source (operand) matrices for each of these matrix multiply operations are derived. For example, in some embodiments the first matrix of data elements from the first source register is extracted from a first portion of the first source register, and the data processing circuitry is responsive to the control signals to perform the matrix multiply operation as a first matrix multiply operation comprising: extracting the second matrix of data elements from a first portion of the second source register; and applying the square matrix of result data elements to a first portion of the destination register; and the data processing circuitry is responsive to the control signals to perform the second matrix multiply operation comprising: extracting the second matrix of data elements from a second portion of the second source register; and applying the square matrix of result data elements to a second portion of the destination register.

Alternatively, in other embodiments the data processing circuitry is responsive to the control signals to perform the matrix multiply operation as a first matrix multiply operation comprising: extracting the first matrix of data elements from a first portion of the first source register; extracting the second matrix of data elements from a first portion of the second source register; and applying the square matrix of result data elements to a first portion of the destination register; and wherein the data processing circuitry is responsive to the control signals to perform the second matrix multiply operation comprising: extracting the first matrix of data elements from a second portion of the first source register; extracting the second matrix of data elements from a second portion of the second source register; and applying the square matrix of result data elements to a second portion of the destination register.

In other words, depending on the particular implementation, the two matrix multiply operations may take the same first operand matrix (extracted from a first portion of the first source register) and apply this in respective matrix multiply operations to a first and second matrix extracted from the second source register, or may extract two source matrices from the first source register and two source matrices from the second source register, these being respectively multiplied to form the first and second result matrices.

Once more, analogously to the explanation above that the portion of the destination register to which a result matrix is applied may be variously defined and specified, in such embodiments in which respective portions of the first source register are used for respective matrix multiply operations, this first portion may also be variously defined. In some embodiments the first portion of the first source register is predetermined for the data processing circuitry. In other embodiments the matrix multiply instruction further specifies the first portion of the first source register.

In such embodiments in which the data processing apparatus is responsive to the matrix multiply instruction to perform a first matrix multiply operation to generate a first result square matrix and a second matrix multiply operation to generate a second result square matrix, the present techniques are not limited to just two matrix multiply operations being performed and in some embodiments the data processing circuitry is further responsive to the control signals to perform at least one further matrix multiply operation to generate at least a further square matrix of result data elements.

Further, in such embodiments in which the apparatus performs more than one matrix multiply operation in response to the matrix multiply instruction, not only may there be a variety of ways in which respective portions of the source registers are used to provide the respective data elements of the source matrices, the present techniques also further propose the use of an additional instruction, executed prior to the matrix multiply instruction, which prepares the content of one of the source registers for the subsequent matrix multiply operations. Specifically, in some embodiments the decoder circuitry is responsive to a copying load instruction preceding the matrix multiply instruction and specifying a memory location and the first source register to generate copying load control signals, and the data processing circuitry is responsive to the copying load control signals to perform a copying load operation comprising: loading the first square matrix of data elements from the specified memory location into the first portion of the first source register; and copying the first square matrix of data elements into the second portion of the first source register, and wherein the second matrix of data elements from the second source register is extracted from the first portion of the second source register. In other words, it will be appreciated that, as a result of the execution of the copying load instruction followed by the matrix multiply instruction in such embodiments, the same square matrix of data elements is then used as the first operand matrix in each of the first and second matrix multiply operations carried out as a result of the matrix multiply instruction.

As mentioned above, the proportion of a given register which may be used in the discussed embodiments in which a "portion" thereof is taken may take a variety of forms, but in some specific embodiments the first portion of the first source register is a first half of the first source register, the first portion of the second source register is a first half of the second source register, and the first portion of the destination register is a first half of the destination register.

In such embodiments in which these proportion are halves of the respective registers, the present techniques further contemplate the provision of a register content swapping instruction which may be used in the present techniques and in some such embodiments the data processing circuitry is further responsive to a register content swapping instruction to perform a register content swapping operation to swop content of the first half and the second half of one of the first source register and the second source register. Accordingly, by the use of this register content swapping instruction, the halves of one of the first and second source registers may be swapped, such that after a first matrix multiplier operation has been carried out the swap may occur before the second matrix multiplier operation is carried out. This provides a further degree of flexibility as to the manner in which respective halves of the first and second source register are multiplied with one another in order to generate the first and second result square matrices.

Nevertheless, the present techniques do not envisage that it is essential that such a register content swapping instruction is explicitly defined and in some embodiments the data processing circuitry is further responsive to the control signals, after the first matrix multiply operation and before the second matrix multiply operation, to perform a register content swapping operation to swop content of the first half and the second half of one of the first source register and the second source register. In other words, without the use of an additional register content swapping instruction, in some embodiments the swapping may automatically be carried out between the performance of the first and second matrix multiply operations.

Indeed, in some embodiments whether or not this register swapping operation is carried out is a choice available to the programmer and thus in such embodiments the matrix multiply instruction specifies whether the register content swapping operation is to be carried out. Moreover, in some embodiments the matrix multiply instruction specifies which of the first source register and the second source register is to be the subject of the register content swapping operation.

It may the case that the first matrix of data elements is extracted from the first source register in a one-to-one fashion, namely wherein all data elements of the first matrix are extracted from, and only from, the first source register. However the present techniques provide further embodiments in which the matrix multiply instruction further specifies a third source register, and wherein the matrix multiply operation comprises extracting the first matrix of data elements from the first source register and the third source register. For example, in such an embodiment it may be the case that a first half of the first matrix of data elements is extracted from the first source register, whilst the second half of the first matrix of data elements is extracted from the third source register. A similar principle applies to the extraction of the second matrix of data elements from the second source register, and accordingly in some embodiments the matrix multiply instruction further specifies a fourth source register, and wherein the matrix multiply operation comprises extracting the second matrix of data elements from the second source register and the fourth source register. Indeed, the same principle also applies to the specification of the destination register in the matrix multiplication instruction, and accordingly in some embodiments the matrix multiply instruction further specifies a further destination register, and wherein the matrix multiply operation comprises applying the square matrix of result data elements split between the destination register and the further destination register. This provides a further aspect of flexibility to the use of the matrix multiply instructions proposed by the present techniques, in that each of the first and second matrices of data elements which provide the source operand matrices for the matrix multiply operation may be derived from more than one source register, and equally the square matrix of result data elements generated may be applied to more than one destination register, thus providing greater flexibility with regard to the respective sizes of these operand and result matrices and the respective registers from which they are derived or to which they are applied.

At least some embodiments provide a method of operating a data processing apparatus comprising: generating control signals in response to a matrix multiply instruction, wherein the matrix multiply instruction specifies in a plurality of registers, each register capable of storing at least four data elements: a first source register, and second source register, and a destination register; and performing a matrix multiply operation in response to the control signals comprising: extracting a first matrix of data elements from the first source register; extracting a second matrix of data elements from the second source register; performing plural dot product operations to generate a square matrix of result data elements, wherein each dot product operation acts on a respective row of the first matrix of data elements and a respective column of the second matrix of data elements to generate a respective result data element of the square matrix of result data elements; and applying the square matrix of result data elements to the destination register.

At least some embodiments provide an apparatus comprising means for generating control signals in response to a matrix multiply instruction, wherein the matrix multiply instruction specifies in a plurality of registers, each register capable of storing at least four data elements: a first source register, and second source register, and a destination register; and means for performing a matrix multiply operation in response to the control signals comprising: means for extracting a first matrix of data elements from the first source register; means for extracting a second matrix of data elements from the second source register; means for performing plural dot product operations to generate a square matrix of result data elements, wherein each dot product operation acts on a respective row of the first matrix of data elements and a respective column of the second matrix of data elements to generate a respective result data element of the square matrix of result data elements; and means for applying the square matrix of result data elements to the destination register.

At least some embodiments provide a virtual machine computer program comprising program instructions to control a host data processing apparatus to provide an instruction execution environment corresponding to the apparatus according to any of the embodiments described above.

At least some embodiments provide a virtual machine computer program comprising program instructions to control a host data processing apparatus to provide an instruction execution environment in which the method according to any of the above-mentioned embodiments can be carried out.

At least some embodiments provide a computer readable storage medium in which the virtual machine computer program of any of the above-mentioned embodiments is stored in a non-transient fashion.

Some particular embodiments are now described with reference to the figures.

Figure 1:
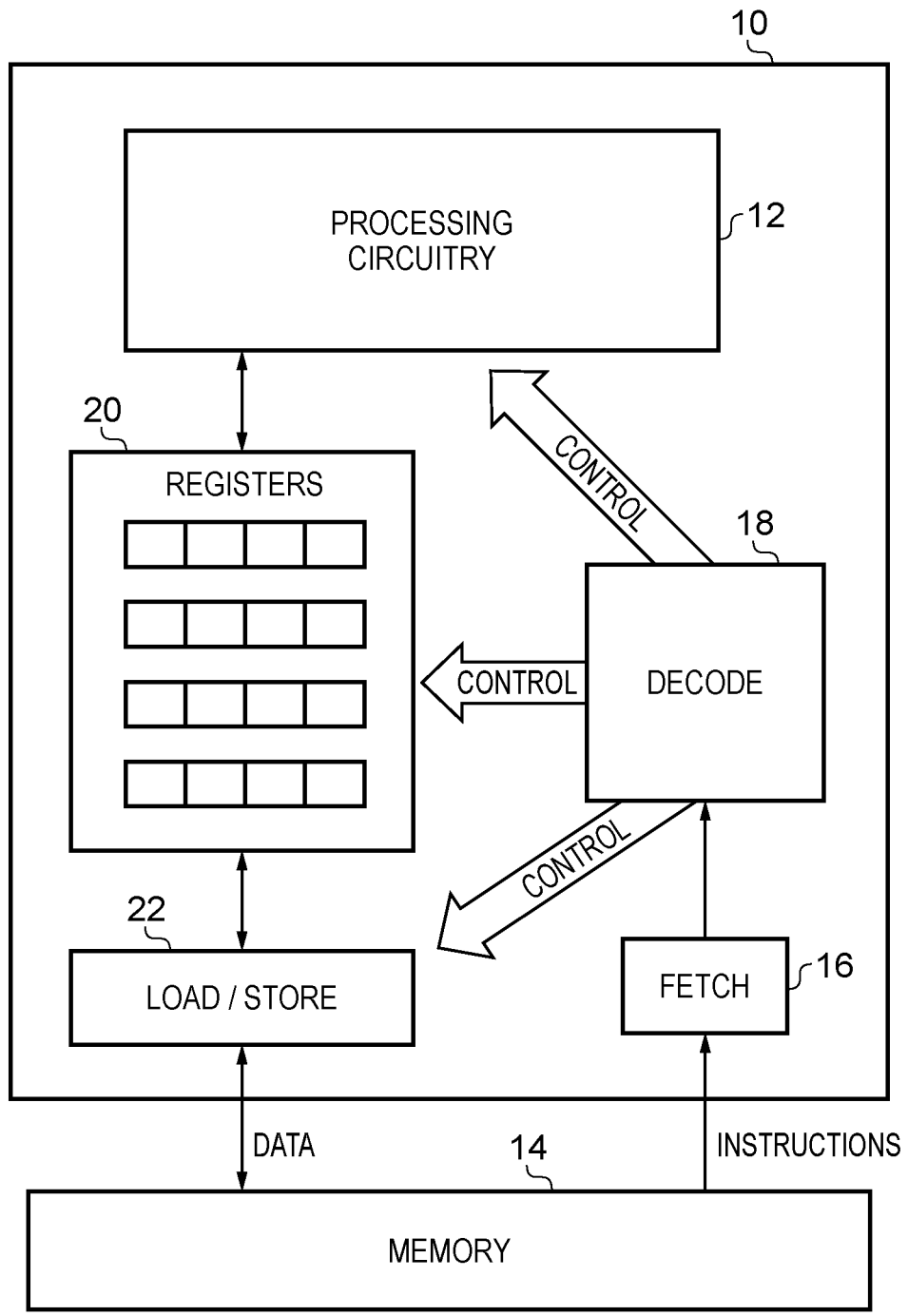

FIG. 1 schematically illustrates a data processing apparatus 10 which may embody various examples of the present techniques. The data processing apparatus comprises processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Furthermore, instructions retrieved by the fetch circuitry 16 are passed to the decode circuitry 18, which generates control signals which are arranged to control various aspects of the configuration and operation of the processing circuitry 12. A set of registers 20 and a load/store unit 22 are also shown. Generally, the processing circuitry 12 may be arranged in a pipelined fashion, yet the specifics thereof are not relevant to the present techniques. One of ordinary skill in the art will be familiar with the general configuration which FIG. 1 represents and further detail description thereof is dispensed herewith merely for the purposes of brevity. The registers 20, as can be seen in FIG. 1, each comprise storage for multiple data elements, such that the processing circuitry can apply data processing operations either to a specified data element within a specified register, or can apply data processing operations to a specified group of data elements (a "vector") within a specified register. In particular the illustrated data processing apparatus is concerned with the performance of matrix multiply operations with respect to matrices formed of data elements held in the registers 20, further explanation of which will follow in more detail below with reference to some specific embodiments. Data values required by the processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on. The present disclosure describes various novel instructions which the processing circuitry 12 can execute and the figures which follow provide further explanation of the nature of these instructions, variations in the data processing circuitry in order to support the execution of those instructions, and so on.

Figure 2A:
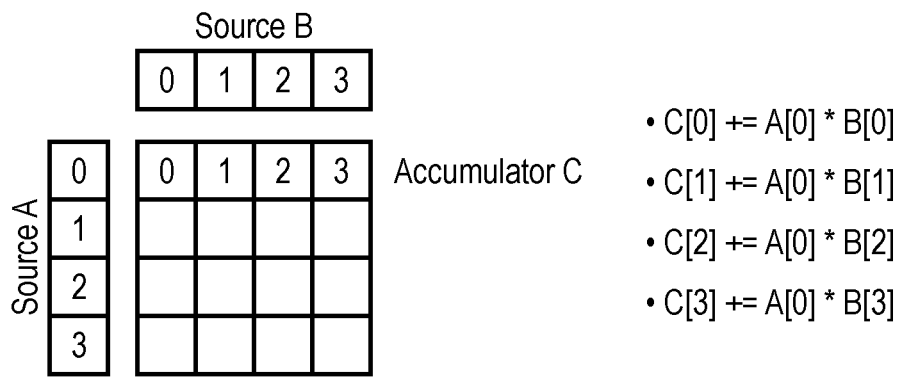
Figure 2B:
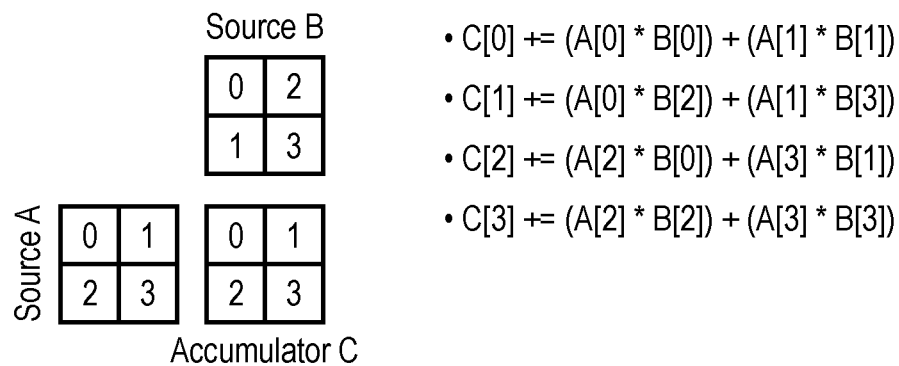

FIGS. 2A and 2B illustrate the present techniques, in particular the approach taken in which the multiple data elements of a register are treated as the two dimensional array of elements of a matrix. In the example of FIG. 2B four data elements in each of the registers A, B and C are treated as the elements of 2×2 matrices. This is to be contrasted with the example shown in FIG. 2A in which the four data elements of registers A, B and C are treated as a simple one dimensional array of elements, i.e. as a vector. Using a technique whereby one data element from one source register (element 0 in source A) and a vector of data elements (the four data elements of source B) are specified as the operands for a vector-by-element multiply-and-accumulate operation, FIG. 2A shows how a vector of data elements may be generated for accumulation in register C. This vector of data elements may for example represent a row of a matrix, and accordingly in this interpretation what is illustrated can be considered to represent a calculation of one row of a 4×4 result matrix which is generated by the vector-by-element operation. In other words, calculation of the full 4×4 matrix of data elements would require three further such vector-by-element operations in order to generate the corresponding three further rows.

This is to be contrasted with the approach taken in FIG. 2B according to the present techniques wherein the vectors of each of the registers are each treated as holding four data elements each representing a 2×2 matrix. A matrix multiplication is carried out using the 2×2 matrix held in source register A with the 2×2 matrix held in source register B in order to generate the 2×2 matrix which will be accumulated in register C. A particular point to note with reference to FIGS. 2A and 2B is that both involve three vector reads and one vector write (i.e. reading from registers A, B and C and writing to register C). Note of course that the emphasis here with regard to a "vector" read or write is the multiplicity of data elements involved in that read or write, not that the group of data elements must necessarily be interpreted to represent a vector, since this is precisely the emphasis of the comparison between FIGS. 2A and 2B, namely the vector interpretation in FIG. 2A and the matrix interpretation in FIG. 2B. In other words, whilst both FIGS. 2A and 2B represent read and write operations in which up to four data elements are read or written in each read or write operation, note that in the operations shown in FIG. 2A these comprise four multiply-accumulate operations, whilst in FIG. 2B these are shown to be eight multiply-accumulate operations. Note that these multiply-accumulate operations are also referred to herein as "fused multiply-accumulate" (FMAs) since the specific unit of circuitry which is commonly used to implement such calculations is such a "fused multiply-accumulate" device, rather than two independent devices (one multiply, one accumulate). As such it should be appreciated that the matrix multiply instruction provided by the present techniques enables a higher computation density to be specified. It is important also to appreciate that the present techniques can be implemented in a vector processing context, i.e. wherein the above described "interpretation" of the content of a register takes place within the vector length of the apparatus providing that vector processing support. Accordingly in the example of FIG. 2B, the width required to hold the four data elements representing a 2×2 matrix is then the vector length, and the illustrated processing is then repeated for distinct, independent vectors in as many such vectors as the apparatus can support. This vector processing concept is applicable to all of the examples which follow, yet typically only one vector length's worth of data values and processing is illustrated for and clarity of the figures.

Figure 3:
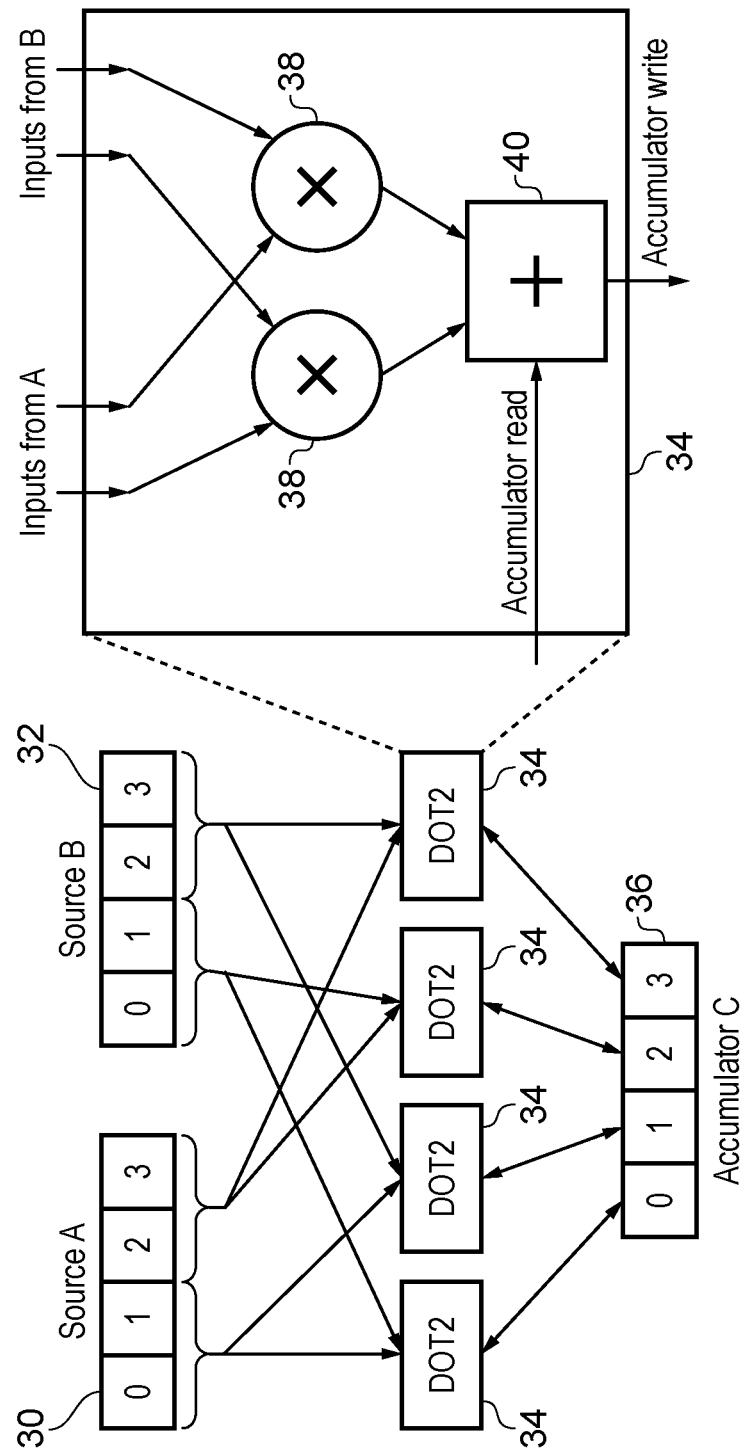

FIG. 3 schematically illustrates the configuration of circuitry provided to support the kind of operation illustrated in FIG. 2B. A first source register 30 (A) and a second source register 32 (B) are connected as illustrated (under the control of the relevant control signals generated by the decode circuitry 18) to four identical units 34, which each take two inputs from source register A and two inputs from source register B, and perform a dot product operation using these inputs. These units 34 are also connected (under the control of the relevant control signals generated by decode circuitry 18) to the register 36 (C), into which the result is accumulated. Accordingly, the values read from accumulator C form a further input to each unit 34 such that this may be summed, in the addition circuitry 40, with the result of the multiplications performed by the multiplication circuitry units 38, and the result is then written back to the relevant element of the accumulator C (i.e. in register 36). Each of the units 34 may be represented by a fused multiply-add circuit, as will be familiar to one of ordinary skill in the art.

Figure 4:
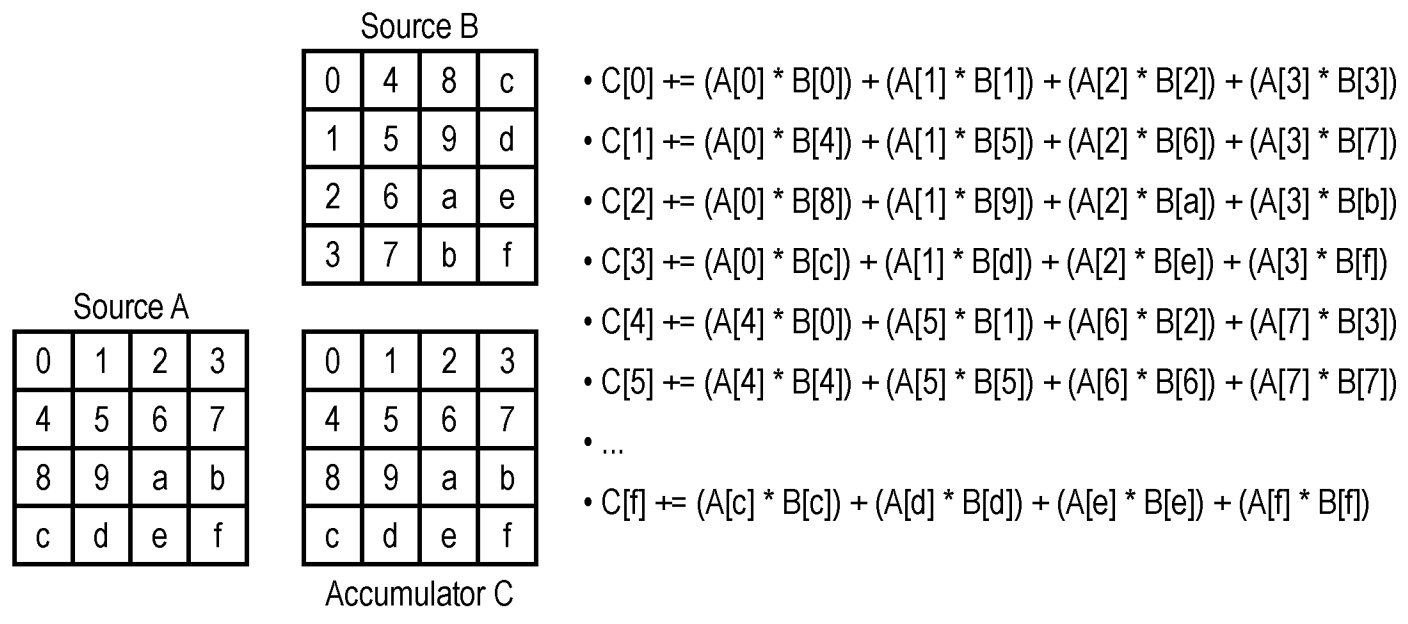

FIG. 4 shows an example which (by comparison with FIG. 2B) will be recognised to illustrate an extension of the approach to the multiplication of two 4×4 matrices to generate a result 4×4 matrix. The corresponding element generation operations for the sixteen elements of the resulting matrix to be accumulated in accumulator C are shown. Note therefore that in response to a single matrix multiply instruction triggering this 4×4 matrix multiplication, 64 operations are carried out (there being four multiply-accumulate portions to the calculation of each of the sixteen elements of C). Moreover, where the content of these registers may be read and written in one vector read/write, the computation density shown in FIG. 4 is a factor of 8 higher still than that of the example of FIG. 2B. This is to be compared with an approach in which the above-mentioned vector-by-element operations are carried out, according to which a sixteen element vector would be treated as a sixteen element one dimensional array. In that approach where a SIMD (single instruction multiple data) instruction might be used to initiate 16 parallel operations, a further 3 instructions would be required in order to complete the required 64 operations for the full calculation of the 4×4 matrix accumulated in C. Moreover, each of these instructions would involve three vector reads and one vector write. This is to be compared to the approach of the present techniques, where in the example shown in FIG. 4 a factor of four times more fused multiply-accumulate operations are specified by the matrix multiply instruction, with the same number of register operands, i.e. only three vector reads and one vector write. In general therefore it will be recognised that the use of the matrix multiply instruction of the present techniques facilitates higher computational throughput for matrix multiply applications, without requiring extra register file bandwidth.

Whilst it may be the case that the data elements of the matrices held in each of the source registers and the data elements accumulated in the destination register may have the same size, this need not be the case. Furthermore, whilst (as in the examples discussed above with reference to FIGS. 2B and 4) the source matrices may have the same dimensions as the square matrix of result data elements, this also need not be the case. FIG. 5 illustrates both of these points. FIG. 5 shows an example in which the registers used are 128-bit registers. Furthermore, the source registers use this capacity to each store sixteen 8-bit elements, whilst the accumulator register uses this capacity to store four 32-bit elements. Thus, as illustrated, the matrix multiplication represented comprises performing a matrix multiply operation between a 2×8 source matrix and a 8×2 source matrix to generate a 2×2 result matrix. The dimensional difference between the source matrices and the result matrix may be less in other examples, e.g. where a 2×4 matrix is multiplied by a 4×2 matrix to generate a 2×2 matrix, or may even be more extreme, for example as a variant on the example of FIG. 5 a 2×16 matrix might be multiplied by a 16×2 matrix to generate a 2×2 result matrix. Remaining with the example of this being implemented in an apparatus with 128-bit registers, it will be noted that the asymmetry between the data element sizes in the source matrices and the result matrix would then be even greater, namely where the 32 data elements of each source matrix would each be 4-bit elements. The present techniques are particularly flexible in this regard and this trade off between the number of data elements represented by a given register content and the corresponding size of each data element represents a trade off which the programmer using the instruction of the present techniques can balance depending on the computational context in which the instructions are being used. In extreme examples the data elements may have a very limited size, where the computational parallelism provided by the instruction is of more significance, whilst at the other end of the range of possibilities the same data element size may be maintained between the source matrix data elements and the result matrix data elements, where the precision of the source matrix data elements is of more significance. It is further to be noted that implementations can even be provided in which each data element of the source matrices is minimally represented (e.g. binary or ternary), when the computational context is appropriate.

FIG. 6 schematically illustrates a further example of a matrix multiply operation initiated by a matrix multiply instruction of the present techniques. FIG. 6 shows a register 50 which has a 512-bit size, such that the maximum "vector length" in the data processing apparatus of which this register forms part is also 512-bits. Moreover, this register is shown as being treated as comprising sixteen 32-bit data elements. In the lower part of FIG. 6, these sixteen data elements are shown as being interpreted as a 4×4 matrix of data elements in each of the source registers A and B and in the destination register C. Accordingly, FIG. 6 illustrates the operation of a 32-bit floating point (FP) matrix multiply instruction which specifies registers A, B and C and causes the corresponding 64 operations (refer to FIG. 4 and its description above) in order to multiply the 4×4 matrix taken from each of source registers A and B to generate the 4×4 matrix which is applied to the destination register C. It should be noted that in the illustration of FIG. 6 each of the 4×4 matrices is represented by four blocks of four data elements, but in the example of the matrix multiplication described this is not of any significance, but rather is provided merely to facilitate a comparison with FIG. 7A which follows.

Turning to FIG. 7A, the same 512-bit register 50 is shown with four portions 52, 54, 56, and 58 labelled. These four portions of source register A, source register B, and destination register C are graphically illustrated by the dashed lines surrounding the groups of four data elements in FIG. 7A. Accordingly, each of four 2×2 result matrices to be stored in destination register C are generated by a separate matrix multiply operation. Moreover in the example of FIG. 7A these are shown as being initiated by four distinct matrix multiply instructions, wherein each (in addition to specifying that the matrix multiply operation generates a 2×2 matrix using floating point 32-bit data values) specifies the destination register, the source registers, and a portion of each register. In this manner, the first matrix multiply operation is performed using a 2×2 matrix taken from a first portion of the two source registers and the result is stored in a first portion of the destination register C. The three further such matrix multiplication operations are then specified by the three further matrix multiply instructions, each of which names one of the three further portions of the register.

FIG. 7B schematically illustrates an example of circuitry used to implement the FIG. 7A processing. Registers A, B, and C are shown as four-portion registers 70, 71, and 76 respectively. Four-input multiplexers 72 and 73 are connected to the respective four portions of each of registers A and B, with each multiplexer controlled by the "portion" value derived from the instruction. The two portions thus selected form the two inputs to matrix multiply circuitry 74, which may be in the form of the example of FIG. 3. The resulting four elements of the result matrix form the single input to multiplexer 75, which is connected to the respective four portions of register C. Multiplexer 75 is also controlled by the "portion" value derived from the instruction, to direct the four elements of the result matrix into one of the portions of register C. This type of circuitry for selection from a particular portion of a register, and writing a result to a particular portion of a register, may equally be provided to support the processing of other examples described herein.

As such it will be recognised with respect to the example of FIG. 7A that a particular matrix multiply instruction may choose to limit the data processing operations to a portion of both the source registers and the destination register. However, a similar restriction may also result from a configuration which is applied to the data processing apparatus by software which restricts the vector length it can use to be shorter than its "native" (hardware-based) vector length. FIG. 8 also shows the 512-bit register 50 wherein in this example it is illustrated that a software defined maximum vector length 60 has been applied limiting the maximum vector length to 256-bits. This maximum vector length is "software defined" in that an instruction is provided to which the decoding circuitry 18 responds by generating relevant control signals to set the value of this maximum vector length 60. Once this maximum vector length has been constrained in this manner this also applies a constraint on the matrix multiply operations which the apparatus can then carry out. Using the example of FIG. 6 further, it can be seen that (still having 32-bit data elements) the 512-bit space required to store the 4×4 matrix of the example of FIG. 6 is not available and therefore this 4×4 matrix multiplication cannot be carried out. However, referring to the example of FIG. 7A, the capacity to store two 2×2 matrices is available and this is represented in FIG. 8. Nonetheless, it will be further appreciated that there are a number of ways in which the 8 data elements of source register A could be matrix multiplied by data elements of source register B in order to generate one or more result matrices for storage in destination register C. These possibilities are discussed further with reference to FIGS. 11A-C and FIGS. 12A-C below. Nevertheless, with reference to FIG. 8 it should be noted that the imposition of the software defined maximum vector length can be seen as having imposed a limit on the number of matrix multiply operations that are carried out in an example in which both of the square matrices in the two halves of the available portion of the destination register C shown in FIG. 8 are carried out in response to a single matrix multiply instruction. Alternatively this may be seen as a restriction on the dimension of the matrix generated in that a 4×4 matrix (of 32-bit data elements) cannot be generated with this 256-bit maximum vector length imposed and therefore the system is constrained to respond to a matrix multiply instruction by the generation of one or two 2×2 matrices.

Where the capacity of the registers and the size of the data elements allows, there can be considerable flexibility as to the different matrix multiply operations which may be carried out in response to one or more matrix multiply instructions of the present techniques. FIG. 9 illustrates up to 16 data elements being extracted from each of source register A and source register B. In each case, these are further illustrated as potentially being sub-divided into two parts each comprising 8 data elements taken from a respective half of source A and source B. Based on an example of 512-bit registers, in one example, the full set of data elements illustrated in FIG. 9 may be involved in a single matrix multiplication operation, mainly where an 8×8 matrix of 8-bit data elements is generated as a result of an 8×2 matrix of 32-bits of data elements from source A being matrix multiplied by a 2×8 matrix of 32-bit data elements from source B. However, within this example there are several permutations possible. For example, in a view where each group of four squares in FIG. 9 only represents one data element and accordingly a 4×1 matrix of 128-bit data elements from source A is multiplied by a 1×4 matrix of 128-bit data elements from register B to generate a 4×4 matrix of 32-bit data elements. Further, only one of the two labelled portions of either of source A or source B may be used to provide the elements of the source matrices and a corresponding square matrix may then be generated. For example, where only source A(0) and source B(0) provide the data elements for the operand matrices, a correspondingly smaller result matrix may also then be generated. Once more the trade-off between the size of the individual data elements and the number of data elements which then form a given matrix can also vary.

FIG. 10 illustrates another example in which the destination register has a greater storage capacity than that required to store the square result matrix generated by a particular matrix multiply operation. As illustrated, here the multiplication of a 2×4 matrix by a 4×2 matrix resulting in a 2×2 matrix generates a set of result data elements which only require half of the capacity of the destination register for that storage and are shown graphically in FIG. 10 being applied to portion 0 of the destination register. The lower part of FIG. 10 illustrates that this may result by default where the destination register is merely named in the matrix multiply instruction, and a second example is given in which this portion is explicitly named in the matrix multiply operation.

FIGS. 11A and 11B illustrate some further examples which illustrate where a given matrix multiply operation results in a square result matrix which does not occupy the full capacity of the destination register. Specifically, in the examples of FIGS. 11A and 11B, the 2×2 matrix multiply operations considered each generate 2×2 result matrices which only occupy half of the destination register C. Where these are illustrated as being FP32 (i.e. floating point 32-bit instructions), these examples then represent registers with a maximum capacity of 256-bits. This may for example be the native capacity of the registers or, as discussed above with reference to FIG. 8, could result from a software imposed restriction on the maximum vector length. Accordingly, in the example of FIG. 11A, a first instruction is shown which merely specifies the source registers A and B and the destination register C. As a result of executing this instruction the apparatus can, by default, select only the portion of source register A which contains the illustrated 2×2 of matrix data elements. As shown graphically in FIG. 11A this can then be multiplied by respective portions of the content of source register B in order to generate two result square matrices for application to the two respective portions of destination register C. In the other example instruction shown in FIG. 11A the portion of Figure A to be used is explicitly named in the instruction (i.e. portion "0") and this is then applied to the two halves of source register B in two respective matrix multiplication operations to generate the two square result matrices stored in the respective portions of destination register C.

FIG. 11B illustrates another manner in which the respective content of two portions of source register A and source register B may be used in response to a single matrix multiply operation in order to generate two result square matrices for application to respective portions of destination register C. In the example of FIG. 11B a first portion of source register A is matrix multiplied by a first portion of source register B, with the resulting square 2×2 matrix being applied to a first portion of the destination register C. Similarly, in parallel, a second portion of the source register A is multiplied by a second portion of the source register B to generate a second square result matrix which is applied to a second portion of the destination register C.

FIG. 11C schematically illustrates the operation of a further instruction in some embodiments, namely a copying load instruction which specifies a memory location from which a data value is retrieved and stored in one portion of a specified register A. The data value is also copied into the other portion of register A. This copying may be implemented by means of the load directly loading the same value into both halves of register A, or by a copy from the first half of register to the second half of register A being carried out following the load. In the context of the present techniques, this copying load instruction enables flexibility in terms of the approaches shown in FIGS. 11A and 11B. For example, by performing the copying load of FIG. 11C in advance of executing the matrix multiply instruction of FIG. 11B the same content will be present in each half of source register A and accordingly the effect is the same as that of FIG. 11A namely where content taken from half of source register A is multiplied by the respective content in two halves of source register B to generate the two square result matrices which are applied to the respective halves of destination register C.

FIG. 11D schematically illustrates example circuitry provided in one embodiment to support the second example instruction of FIG. 11A. Source registers A and B are shown as two-portion registers 120 and 122 respectively. Two-input multiplexer 124 is connected to the respective two portions of register A. The multiplexer is controlled by an "element select" signal, set by the instruction (i.e. as "0" in the second instruction example of FIG. 11A). The portion thus selected forms one input to each instance of the matrix multiply circuitry 126 and 128 (which may be in the form of the example of FIG. 3). The other input for each of matrix multiply circuitry 126 and 128 are the respective portions of source register 122 (B). The resulting two 2×2 matrices are written to the respective portions of register 130 (C). By comparison, for the "fixed portion" example (the first instruction example of FIG. 11A), portion 0 is routed directly to both multiply circuits, and for the FIG. 11B example the routing from register A would be the same as that shown in FIG. 11D for register B (i.e. portion 0 to matrix multiply circuit 0 and portion 1 to matrix multiply circuit 1).

The present techniques also propose another matrix multiply instruction which, as part of the data processing operations which it causes to take place, can also cause a swap (at least a swap in effect—see below) of the content of two halves of a given source register. This is shown in the example of FIGS. 12A and 12B in which the instruction specifies source register A and source register B, causing a first matrix multiply operation to be carried out multiplying together a 2×2 matrix taken from a first portion of source register A with a 2×2 matrix taken from a first portion of source register B. This is stored in a first portion of destination register C. A second matrix multiply operation is also carried out multiplying together a 2×2 matrix taken from the second portion of source register A with a 2×2 matrix taken from a second portion of source register B. This is stored in the second portion of destination register C. In the example of FIG. 12A the swap flag is not set, so no swapping took place.

In the example of FIG. 12B the swap flag is set. This causes the content of the two portions of source register A to be swapped, at least for the purposes of the matrix multiplication operations to be carried out. So for example this can be done just by temporarily switching the order in which the portions of source register A are accessed, so that the instruction then first causes the second portion of source register A to be used for the first matrix multiply operation and the first portion of source register A to be used for the second matrix multiply operation. Nevertheless the two portions of source register A could be explicitly swapped if desirable, though the additional processing step that this would involve may not make it an attractive option if processing speed is the prime aim. Either way, as can be seen in FIG. 12B, the setting of the swap flag causes the opposite diagonal pair of matrices to be generated to those generated in FIG. 12A. Thus, the first matrix multiply operation is carried out multiplying together a 2×2 matrix taken from a first portion of source register A (but noting that the first and second portions of A were "swapped" prior to this step) with a 2×2 matrix taken from the first portion of source register B. This is stored in a first portion of destination register D. The second matrix multiply operation is then carried out multiplying together a 2×2 matrix taken from the second portion of source register A (again, noting that this in on the "swapped" version of A) with a 2×2 matrix taken from the second portion of source register B. This is stored in the second portion of destination register D. Accordingly, the "swap enabled" instruction of FIGS. 12A and 12B allows the programmer to flip between the generation of the opposite diagonal pairs of matrices by the simple mechanism of setting or un-setting the swap flag. Further, by executing both the unset version and the set version, the full set of four 2×2 sub-matrices forming the result of the full matrix multiplication of the two source matrices in each of source registers A and B can be generated if required. In the example of FIGS. 12A and 12B described above, this full result is given by the content of registers C and D (with a diagonal pair of 2×2 sub-matrices in each). In terms of the processing involved, an advantage of this approach is that in an inner loop (where most processing time is spent), the only actions required are to load A and B and perform the two MMUL operations (i.e. the unswapped and swapped versions). Although the two destinations (C and D) store the result matrix in an unconventional manner (diagonal halves each), this can be rectified outside the inner loop, where it will have less effect on the performance of the program.

FIG. 12C schematically illustrates example circuitry provided in one embodiment to support the examples of FIGS. 12A and 12B. Source registers A and B are shown as two-portion registers 80 and 81 respectively. Two-input multiplexers 82 and 83 are both connected to the respective two portions of register A, noting that the ordering of the portions as inputs is inverted between the two multiplexers. Both multiplexers 82 and 83 are controlled by the "swap" value derived from the instruction (i.e. on or off=1 or 0). The two portions thus selected each form one input to each instance of the matrix multiply circuitry 84 and 85 (which may be in the form of the example of FIG. 3). The other input for each of matrix multiply circuitry 84 and 85 are the respective portions of source register B. The resulting two 2×2 matrices are written to the respective portions of register C (for FIG. 12A—no swap) or register D (for FIG. 12B—swap).

In the preceding examples there has only been a single pair of source registers, each providing one of the two matrices which are multiplied together in the matrix multiply operation. However, the present techniques further provide examples in which at least one of the operand matrices is extracted from more than one source register. An example of this is given in FIG. 13 wherein a first source register A is specified from which a 2×4 matrix of data elements is extracted, but wherein two source registers, namely B1 and B2, are specified. Accordingly, these may be considered to represent either two independent 4×2 matrices, or alternatively one combined 4×4 matrix. Whichever view is put on the representation of the content of source registers B1 and B2, the respective content of these source registers is matrix multiplied by the 2×4 matrix derived from source register A to generate two square result matrices (labelled C1 and C2 in FIG. 13) which are then applied to a respective half of the destination register shown in FIG. 13. Accordingly, further depending on the view of the content of source registers B1 and B2, the content of the destination register may either be considered to be a result 2×4 matrix or two independent 2×2 matrices.

This distribution of a matrix across more than one register is however not limited to only one of the source matrices and FIG. 14 schematically illustrates an example in which this approach is applied to both the source operands and the resulting matrix. For the operation graphically shown in FIG. 14 an instruction has specified four source registers A1, A2, B1, and B2, and has also specified two destination registers C1 and C2. Accordingly, as illustrated 16 data elements are held in the source registers A1 and A2, 16 data elements are held in the source registers B1 and B2, and 16 data elements may be stored in the destination registers C1 and C2. Thus, in response to a single matrix multiply instruction specifying all six registers, a 4×4 matrix may be multiplied by a 4×4 matrix to generate a result 4×4 matrix which is then applied in two halves to the destination registers C1 and C2.

FIG. 15 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor (hardware) 530 running a host operating system (OS) 520 supporting a virtual machine (VM) program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 may be stored on a computer-readable storage medium (which may be a non-transitory medium), and provides an application program interface (instruction execution environment) to an application program 500 which is the same as the application program interface which would be provided by the real hardware which is the device being modelled by the virtual machine program 510. Thus, the program instructions, including any of the matrix multiply instructions described above, may be executed from within the application program 500 using the virtual machine program 510 to model their interaction with the virtual machine hardware.

FIG. 16 shows a sequence of steps which are taken according to the method of one embodiment in response to a matrix multiply instruction of the present techniques being retrieved by the apparatus within the sequence of data processing instructions which it retrieves from memory. The flow begins at step 100 where one of these matrix multiply instructions is received. "Received" here may be understood to be the process by which an instruction is fetched from memory and decoded, and further includes the generation of the relevant control signals for the processing circuitry and registers by the decoding circuitry in order that particular operations may be carried out. These enable the following steps of this procedure shown in FIG. 16 to be carried out. The next step 102 therefore comprises the extraction of a first matrix of data elements from the first source register specified in the matrix multiply instruction. At the next step 104 a second matrix of data elements is extracted from the second source register specified in the matrix multiply instruction. It should be appreciated that FIG. 16 shows a sequence of steps which are generally carried out when implementing the present techniques and detail from any of the above-described embodiments may be imported into the relevant steps of FIG. 16. For example, the extraction of the first and second matrices from the first and second source registers in steps 102 and 104 may comprise extracting these matrices from a specified portion of either or both of the first and second source registers when implementing the relevant embodiments of the present techniques. However the first and second matrices are extracted from the first and second source registers, an iterative process may then be carried out represented by steps 106 and 108 of the diagram in which a dot product operation is performed on a given row of the first matrix and a given column of the second matrix to generate a data element for a given position within the result matrix. Where further dot product operations remain to be carried out to generate further data elements of the result matrix the flow loops back from step 108 to 106 for these to be performed. It should nevertheless be appreciated that although for the sake of simplicity of illustration the steps of 106 and 108 in FIG. 11 are shown as being carried out in a sequential fashion the present techniques are certainly not limited to this iterative, sequential approach and, for example as may readily be seen from the example circuitry shown in FIG. 3, the respective "iterations" of this procedure may in fact be carried out in parallel with one another. Once the full set of data elements forming the square result matrix has been generated it is then applied to the destination register specified in the matrix multiply instruction, for example, by accumulation with pre-existing content of that destination register (step 110).

In brief overall summary, techniques for performing matrix multiplication in a data processing apparatus are disclosed, comprising apparatuses, matrix multiply instructions, methods of operating the apparatuses, and virtual machine implementations. Registers, each register for storing at least four data elements, are referenced by a matrix multiply instruction and in response to the matrix multiply instruction a matrix multiply operation is carried out. First and second matrices of data elements are extracted from first and second source registers, and plural dot product operations, acting on respective rows of the first matrix and respective columns of the second matrix are performed to generate a square matrix of result data elements, which is applied to a destination register. A higher computation density for a given number of register operands is achieved with respect to vector-by-element techniques.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus comprising:
register storage circuitry having a plurality of registers, each register to store at least four data elements;
decoder circuitry responsive to a matrix multiply instruction to generate control signals, wherein the matrix multiply instruction specifies in the plurality of registers: a first source register, a second source register, and a destination register; and
data processing circuitry responsive to the control signals to perform a matrix multiply operation comprising:
extracting a first matrix of data elements from the first source register;
extracting a second matrix of data elements from the second source register;
performing plural dot product operations to generate a square matrix of result data elements, wherein each dot product operation acts on a respective row of the first matrix of data elements and a respective column of the second matrix of data elements to generate a respective result data element of the square matrix of result data elements; and
applying the square matrix of result data elements to the destination register,
wherein:
the matrix multiply operation is a first matrix multiply operation and the square matrix of result data elements is a first square matrix of result data elements, wherein the destination register has a storage capacity accommodating at least eight data elements and to store at least a second square matrix of result data elements, wherein the data processing circuitry is responsive to the control signals to apply the first square matrix of result data elements to a first portion of the destination register, and wherein the data processing circuitry is further responsive to the control signals to perform a second matrix multiply operation to generate the second square matrix of result data elements and to apply the second square matrix of result data elements to a second portion of the destination register;
the data processing circuitry is responsive to the control signals to perform the first matrix multiply operation comprising:

extracting the first matrix of data elements from a first portion of the first source register;
extracting the second matrix of data elements from a first portion of the second source register; and
applying the first square matrix of result data elements to the first portion of the destination register; and
the data processing circuitry is responsive to the control signals to perform the second matrix multiply operation comprising:
extracting the first matrix of data elements from a second portion of the first source register;
extracting the second matrix of data elements from a second portion of the second source register; and
applying the second square matrix of result data elements to the second portion of the destination register.

2. The apparatus of claim 1, wherein applying the first square matrix of result data elements to the destination register comprises storing the first square matrix of result data elements in the destination register.

3. The apparatus of claim 1, wherein applying the first square matrix of result data elements to the destination register comprises accumulating the first square matrix of result data elements with a previously stored square matrix of result data elements stored in the destination register.

4. The apparatus of claim 1, wherein each data element of the first matrix of data elements and each data element of the second matrix of data elements has a source element bit length which is equal to a result element bit length of each data element of the first square matrix of result data elements.

5. The apparatus of claim 1, wherein each data element of the first matrix of data elements and each data element of the second matrix of data elements has a source element bit length which is different from a result element bit length of each data element of the first square matrix of result data elements.

6. The apparatus of claim 1, wherein the matrix multiply instruction specifies a dimension of the first square matrix of result data elements.

7. The apparatus of claim 6, wherein a storage capacity of the destination register is capable of storing more than one square matrix of result data elements having the dimension specified in the matrix multiply instruction.

8. The apparatus of claim 1, wherein the data elements of the first matrix of data elements, the data elements of the second matrix of data elements, and the result data elements are floating point values.

9. The apparatus of claim 1, wherein the data elements of the first matrix of data elements, the data elements of the second matrix of data elements, and the result data elements are integer values.

10. The apparatus any claim 1, wherein the first matrix of data elements and the second matrix of data elements are non-square rectangular matrices.

11. The apparatus of claim 1, wherein the decoder circuitry is further responsive to a configuration instruction to generate configuration control signals, wherein the configuration instruction specifies a maximum vector length, and the data processing circuitry is responsive to the configuration control signals to constrain subsequent matrix multiply operations such that a total size of the result data elements does not exceed the maximum vector length.

12. The apparatus of claim 1, wherein the data processing circuitry is further responsive to the control signals to perform at least one further matrix multiply operation to generate at least a further square matrix of result data elements.

13. The apparatus of claim 1, wherein the decoder circuitry is responsive to a copying load instruction preceding the matrix multiply instruction and specifying a memory location and the first source register to generate copying load control signals, and the data processing circuitry is responsive to the copying load control signals to perform a copying load operation comprising:
   loading the first matrix of data elements from the specified memory location into the first portion of the first source register; and
   copying the first matrix of data elements into the second portion of the first source register.

14. The apparatus of claim 1, wherein the matrix multiply instruction further specifies at least one of:
   a third source register, and wherein the matrix multiply operation comprises extracting the first matrix of data elements from the first source register and the third source register;
   a fourth source register, and wherein the matrix multiply operation comprises extracting the second matrix of data elements from the second source register and the fourth source register; and
   a further destination register, and wherein the matrix multiply operation comprises applying the first square matrix of result data elements split between the destination register and the further destination register.

15. A non-transitory, computer-readable storage medium storing a virtual machine computer program comprising program instructions to control a host data processing apparatus to provide an instruction execution environment corresponding to the apparatus according to claim 1.

16. A method of operating a data processing apparatus comprising:
   generating, by decoder circuitry, control signals in response to a matrix multiply instruction, wherein the matrix multiply instruction specifies in a plurality of registers, each register capable of storing at least four data elements: a first source register, a second source register, and a destination register; and
   performing, by data processing circuitry, a matrix multiply operation in response to the control signals comprising:
   extracting a first matrix of data elements from the first source register;
   extracting a second matrix of data elements from the second source register;
   performing plural dot product operations to generate a square matrix of result data elements, wherein each dot product operation acts on a respective row of the first matrix of data elements and a respective column of the second matrix of data elements to generate a respective result data element of the square matrix of result data elements; and
   applying the square matrix of result data elements to the destination register,
   wherein:
   the matrix multiply operation is a first matrix multiply operation and the square matrix of result data elements is a first square matrix of result data elements, wherein the destination register has a storage capacity accommodating at least eight data elements and to store at least a second square matrix of result data elements, wherein the matrix multiply operation comprises applying the first square matrix of result data elements to a first portion of the destination register;
   the method further comprises responding to the control signals to perform a second matrix multiply operation to generate the second square matrix of result data elements and applying the second square matrix of result data elements to a second portion of the destination register;
   the first matrix multiply operation comprises:
      extracting the first matrix of data elements from a first portion of the first source register;
      extracting the second matrix of data elements from a first portion of the second source register; and
      applying the first square matrix of result data elements to the first portion of the destination register; and
   the second matrix multiply operation comprises:
      extracting the first matrix of data elements from a second portion of the first source register;
      extracting the second matrix of data elements from a second portion of the second source register; and
      applying the second square matrix of result data elements to the second portion of the destination register.

17. A non-transitory, computer-readable storage medium storing a virtual machine computer program comprising program instructions to control a host data processing apparatus to provide an instruction execution environment in which the method of claim 16 can be carried out.

* * * * *